(12) United States Patent
Parello et al.

(10) Patent No.: US 8,732,259 B2
(45) Date of Patent: May 20, 2014

(54) METHOD AND APPARATUS FOR PROVIDING NOTIFICATION OF NETWORK ALARMS USING A PLURALITY OF DISTRIBUTED LAYERS

(75) Inventors: John Parello, Campbell, CA (US); Rituraj Kirti, San Jose, CA (US)

(73) Assignee: Cisco Technology, Inc., San Jose, CA (US)

( * ) Notice: Subject to any disclaimer, the term of this patent is extended or adjusted under 35 U.S.C. 154(b) by 1 day.

(21) Appl. No.: 13/098,660

(22) Filed: May 2, 2011

(65) Prior Publication Data

US 2011/0208826 A1   Aug. 25, 2011

Related U.S. Application Data

(63) Continuation of application No. 10/291,118, filed on Nov. 7, 2002, now Pat. No. 7,962,589.

(51) Int. Cl.
*G06F 15/16* (2006.01)

(52) U.S. Cl.
USPC .......................................................... 709/207

(58) Field of Classification Search
USPC ................................................. 709/207, 223
See application file for complete search history.

(56) References Cited

U.S. PATENT DOCUMENTS

| | | | |
|---|---|---|---|
| 5,309,448 A | 5/1994 | Bouloutas et al. | |
| 5,325,522 A | 6/1994 | Vaughn | |
| 5,408,218 A | 4/1995 | Svedberg et al. | |
| 5,636,204 A | 6/1997 | Mizuno et al. | |
| 5,636,206 A | 6/1997 | Amemiya et al. | |
| 5,734,697 A | 3/1998 | Jabbarnezhad | |
| 5,768,501 A | 6/1998 | Lewis | |
| 5,771,274 A | 6/1998 | Harris | |
| 5,922,051 A | 7/1999 | Sidey | |
| 6,052,722 A | 4/2000 | Taghadoss | |
| 6,124,790 A | 9/2000 | Golov et al. | |

(Continued)

FOREIGN PATENT DOCUMENTS

| | | |
|---|---|---|
| EP | 0 909 056 | 4/1999 |
| WO | WO 99/20034 | 4/1999 |
| WO | WO 02/086750 A1 | 10/2002 |

OTHER PUBLICATIONS

Du, W. et al., "Practical Alarm Suppression of End-to-End Virtual Circuit Connections," www.dvo.ru/bbc/pdpta/vo11.ps1261.pdf (pp. 1-7) Jun. 27, 2000.

(Continued)

*Primary Examiner* — John MacIlwinen
(74) *Attorney, Agent, or Firm* — Hickman Palermo Truong Becker Bingham Wong LLP

(57) ABSTRACT

A method is disclosed for providing notification of network alarms using a plurality of distributed layers. A message is received that indicates an event occurred at a primary entity. The event is bound to a managed object, which represents the primary entity, to create a bound event. An overall condition is determined for the primary entity, based at least in part on the bound event, to create one or more condition notifications. The impact of a particular condition notification on one or more entities, which are related to the primary entity, is analyzed to create one or more impact notifications. One or more first alarms, which indicate the one or more related entities are impacted by a particular impact notification, are created. One or more second alarms are created based on the one or more first alarms.

21 Claims, 27 Drawing Sheets

(56) References Cited

U.S. PATENT DOCUMENTS

| | | | |
|---|---|---|---|
| 6,154,129 | A | 11/2000 | Kajitani et al. |
| 6,167,448 | A | 12/2000 | Hemphill et al. |
| 6,205,563 | B1 | 3/2001 | Lewis |
| 6,243,746 | B1 | 6/2001 | Sondur et al. |
| 6,253,243 | B1 | 6/2001 | Spencer |
| 6,253,339 | B1 | 6/2001 | Tse et al. |
| 6,263,455 | B1 | 7/2001 | Bannister |
| 6,271,845 | B1 | 8/2001 | Richardson |
| 6,349,333 | B1 | 2/2002 | Panikatt et al. |
| 6,356,885 | B2 | 3/2002 | Ross et al. |
| 6,366,926 | B1 * | 4/2002 | Pohlmann et al. ............ 1/1 |
| 6,393,386 | B1 | 5/2002 | Zager et al. |
| 6,445,774 | B1 * | 9/2002 | Kidder et al. ............ 379/9.03 |
| 6,446,136 | B1 * | 9/2002 | Pohlmann et al. ............ 719/318 |
| 6,604,208 | B1 * | 8/2003 | Gosselin et al. ............ 714/4.12 |
| 6,766,368 | B1 * | 7/2004 | Jakobson et al. ............ 709/224 |

OTHER PUBLICATIONS

European Patent Office, "Search Report", in application No. 05 740 158.0-1853, dated Mar. 21, 2013, 7 pages.

Current Claims in application No. 05 740 158.0-1853, dated Mar. 2013, 3 pages.

* cited by examiner

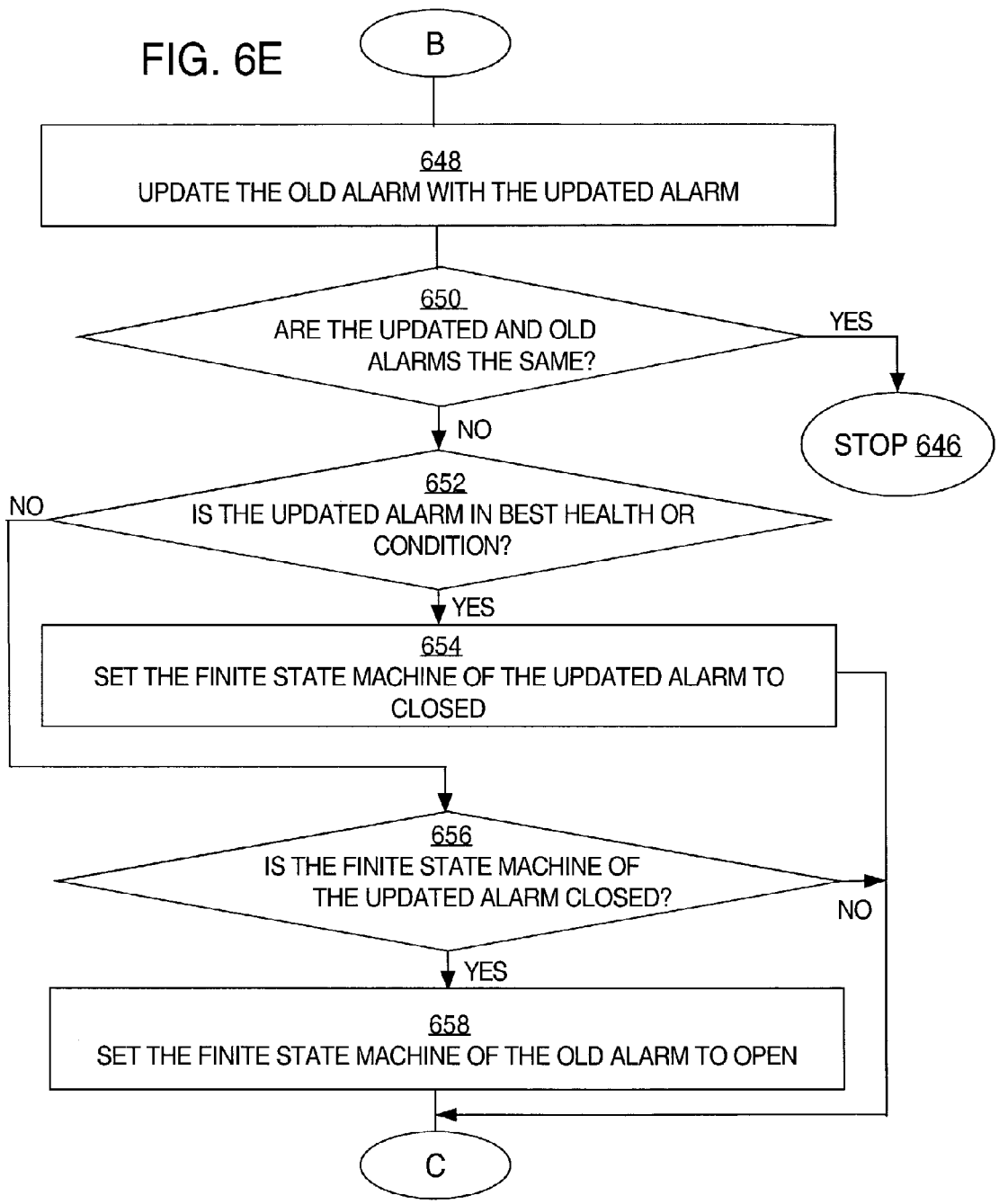

METHOD AND APPARATUS FOR PROVIDING NOTIFICATION OF NETWORK ALARMS USING A PLURALITY OF DISTRIBUTED LAYERS

BENEFIT CLAIM

This application claims the benefit as a continuation of U.S. patent application Ser. No. 10/291,118 filed Nov. 7, 2002 now U.S. Pat. No. 7,962,589, the entire contents of which is incorporated herein by reference for all purposes as if fully set forth herein, under 35 U.S.C. §120. The applicant(s) hereby rescind any disclaimer of claim scope in the parent application(s) or the prosecution history thereof and advise the USPTO that the claims in this application may be broader than any claim in the parent application(s).

FIELD OF THE INVENTION

The present invention generally relates to network data processing. The invention relates more specifically to a method and apparatus for providing notification of network alarms using a plurality of distributed layers.

BACKGROUND OF THE INVENTION

The approaches described in this section could be pursued, but are not necessarily approaches that have been previously conceived or pursued. Therefore, unless otherwise indicated herein, the approaches described in this section are not prior art to the claims in this application and are not admitted to be prior art by inclusion in this section.

Over the course of time, various devices in a network generate events that indicate the current condition of the devices. For example, if a link between a router and a device goes down, an event is generated indicating that the link is down. Filtering events, correlating events, and using rules to analyze the events are approaches that have been used in the past for analyzing events to provide meaningful information to network managers or management systems. An example of filtering events is consolidating several events of the same type into one event. An example of correlating events is correlating that one failure is related to another failure. For example, if one router goes down it may generate a first event and may cause other routers also to generate events, which are correlated back to the first event. An example of using rules to analyze events is performing statistical analysis on the events.

However, there are numerous problems associated with these past approaches. One problem is using one approach to solve the problems that should be addressed by another approach. For example, filtering may be inappropriately used to achieve correlation between events, or performing rules to analyze events may be inappropriately used while filtering events. Another problem with these past approaches is that one network management system may not be able to provide information to another network management system.

Based on the foregoing, there is a clear need for processing events to maintain status in a way that allows one network management system to provide information to another network management system.

Furthermore, there is a need for processing events to maintain status without using one approach to solve the problems that should be addressed by another approach.

BRIEF DESCRIPTION OF THE DRAWINGS

The present invention is illustrated by way of example, and not by way of limitation, in the figures of the accompanying drawings and in which like reference numerals refer to similar elements and in which:

FIG. 6C, FIG. 6D, FIG. 6E, and FIG. 6F are flow diagrams that illustrate a high level overview of one embodiment of a method performed by the Notification—Layer 6;

DETAILED DESCRIPTION OF THE PREFERRED EMBODIMENT

Figure 1A:
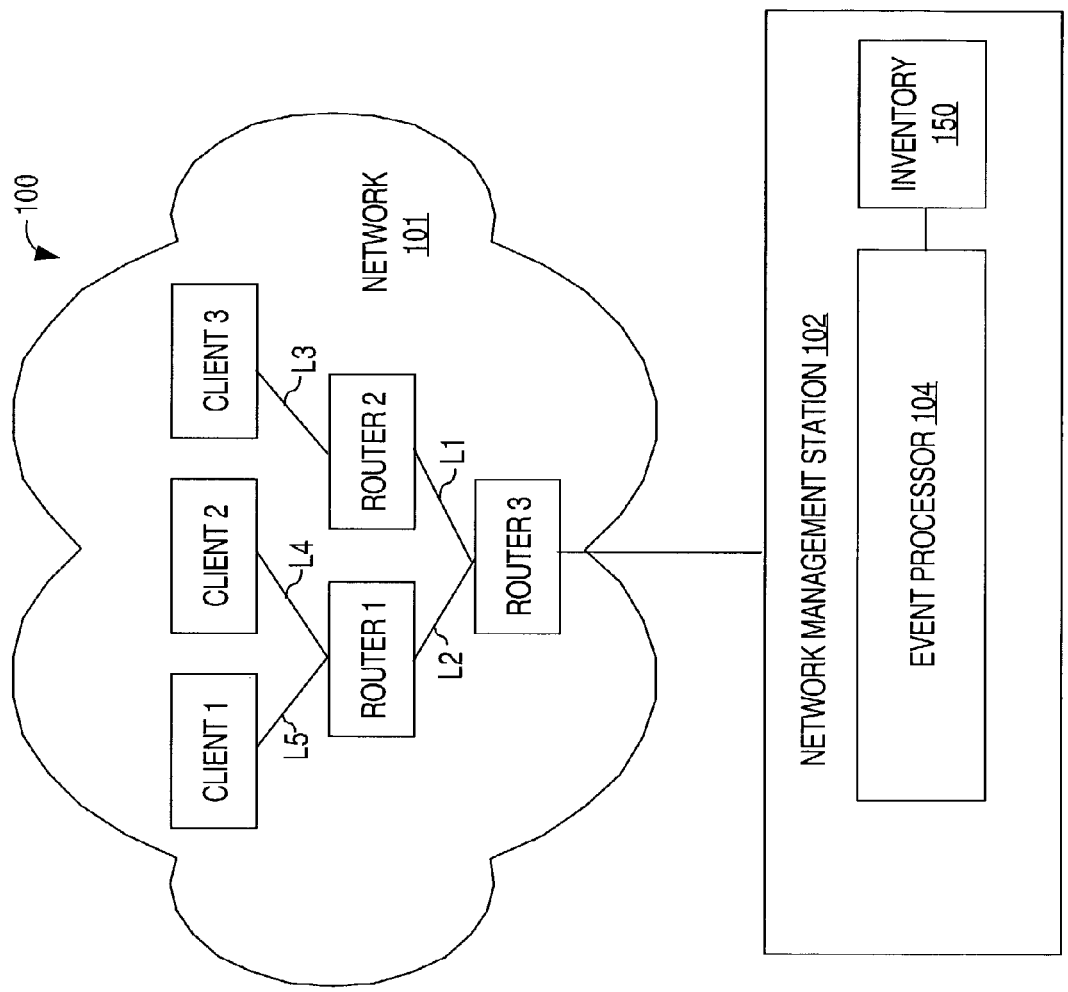
FIG. 1A is a block diagram that illustrates an overview of a system used for providing notification of network alarms using a plurality of distributed layers.

A method and apparatus for providing notification of network alarms using a plurality of distributed layers is described. In the following description, for the purposes of explanation, numerous specific details are set forth in order to provide a thorough understanding of the present invention. It will be apparent, however, to one skilled in the art that the present invention may be practiced without these specific details. In other instances, well-known structures and devices are shown in block diagram form in order to avoid unnecessarily obscuring the present invention.

Embodiments are described herein according to the following outline:

1.0 General Overview
   2.0 Structural and Functional Overview
   3.0 Event Processing System
      3.1 Layers of an Event Processor
      3.2 Message Transport—Layer 1

3.3 The Inventory
4.0 Method of Providing Notification of Network Alarms Using a Plurality of Distributed Layers
    4.1 Process of Providing Notification of Network Alarms Using a Plurality of Distributed Layers
    4.2 Process of Normalizing Events
    4.3 Process of Binding Events
    4.4 Process of Providing Condition Determination
    4.5 Process of Providing Impact Analysis
    4.6 Process of Providing Notification
    4.7 Process of Providing Heuristics
5.0 Implementation Mechanisms—Hardware Overview
6.0 Extensions and Alternatives

1.0 GENERAL OVERVIEW

The needs identified in the foregoing Background, and other needs and objects that will become apparent for the following description, are achieved in the present invention, which comprises, in one aspect, a method for providing notification of network alarms using a plurality of distributed layers. According to one embodiment, a message is received that indicates an event occurred at a primary entity. The event is bound to a managed object, which represents the primary entity, to create a bound event. An overall condition is determined for the primary entity, based at least in part on the bound event, to create one or more condition notifications. The impact of a particular condition notification on one or more entities, which are related to the primary entity, is analyzed to create one or more impact notifications. One or more first alarms, which indicate the one or more related entities are impacted by a particular impact notification, are created. One or more second alarms are created based on the one or more first alarms.

According to one embodiment, one or more of the steps are performed in one or more distributed layers.

According to one embodiment, at least one particular step of the one or more of the steps communicates with at least one other particular step with asynchronous messaging.

According to one embodiment, the asynchronous messaging is performed by publish and subscribe methods. For example, at least one particular step publishes information that at least one other particular step subscribes to.

In other aspects, the invention encompasses a computer apparatus, a computer readable medium, and a carrier wave configured to carry out the foregoing steps.

2.0 STRUCTURAL AND FUNCTIONAL OVERVIEW

FIG. 1A is a block diagram that illustrates an overview of an example system for providing notification of network alarms using a plurality of distributed layers, according to one embodiment. System 100 comprises a Network 101 that includes three routers, three clients, and five links, a Network Management Station 102, an Event Processor 104, and an Inventory 150. Router 3 is connected to Network Management Station 102. Router 1 is connected to Router 3 through Link L2. Router 2 is connected to Router 3 through Link L1. Router 2 is connected to Client 3 through Link L3. Router 1 is connected to Client 2 through Link L4 and to Client 1 through Link L5.

Network Management Station 102 is connected to Network 101. The Network Management Station 102 comprises an Event Processor 104 and an Inventory 150. In general, Network Management Station 102 provides data processing functions for managing Network 101. The Inventory 150 comprises stored managed objects that represent one or more physical and/or logical entities on the Network 101. For example, Inventory 150 may comprise a database of managed objects that represent Client 1, Client 2, Client 3, Router 1, Router 2, Router 3, and Links L1 through L5. Unique values, called managed object identifiers, are used to uniquely identify each managed object in Inventory 150.

When a device, such as Router 3, goes down, an event is generated. Event Processor 104 receives the event and performs processing based on the event to provide meaningful information to a network management administrator or to another system. According to one embodiment, the processing in the Event Processor 104 is performed by a plurality of logical layers, described herein in more detail. In one feature, the layers may be distributed among one or more processes or machines.

3.0 EVENT PROCESSING SYSTEM 3.1 Layers of an Event Processor

Figure 1B:
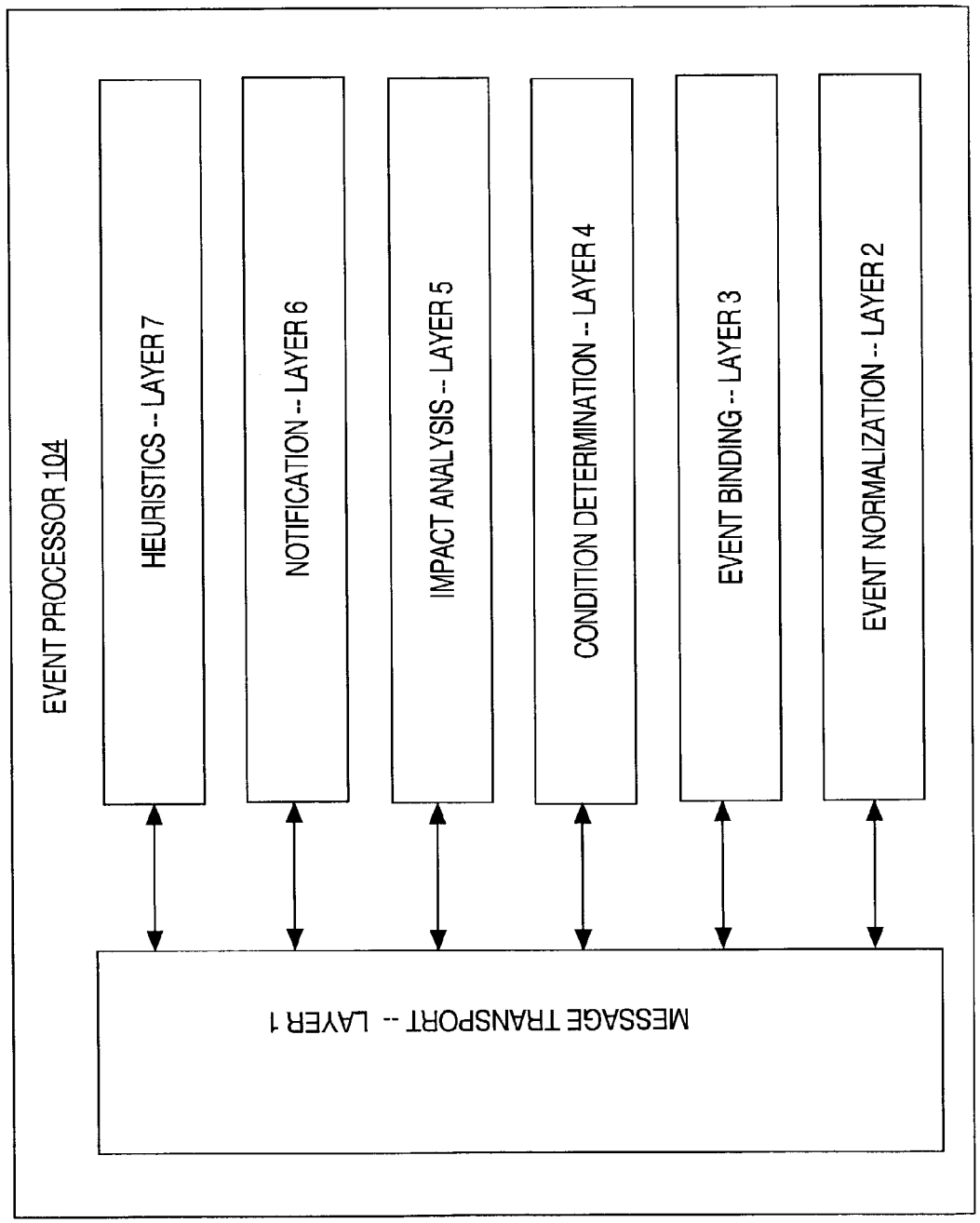
FIG. 1B is a block diagram that illustrates the layers of an event processor.

FIG. 1B is a block diagram that illustrates layers of an event processor, according to one embodiment. Event Processor 104 comprises a Message Transport—Layer 1, an Event Normalization—Layer 2, an Event Binding—Layer 3, a Condition Determination—Layer 4, an Impact Analysis—Layer 5, a Notification—Layer 6, and a Heuristics—Layer 7. Each of the layers comprises one or more programs, processes, or other software elements that provide the function described herein.

The Message Transport—Layer 1 provides asynchronous message communication for Layers 2 through 7. According to one embodiment, Layer 1 is an event bus system or other messaging oriented middleware and communications between Layers 2 through 7 are provided by each layer subscribing to topics that the layer is interested in and by each layer publishing information for topics that layer provides. According to another embodiment, direct function calls may be used for communication between layers that are on the same machine.

According to one embodiment, first and second Message Transport—Layers 1 are provided. The first Message Transport Layer transports messages between layers that are on the same machine and/or process, and the second Message Transport Layer transports messages between layers that are on different machines and/or processes. For example, subscribing and publishing messages may be used for transporting messages between layers that are on different machines, while direct function calls may be used for communication between layers that are on the same machine.

The Event Normalization—Layer 2, receives events from network elements and provides the events to other layers in a canonical format. For example, an SNMP agent, trap generator, or syslog generator on a network device may generate events with different formats. For example, if Router 1 goes down, an event is generated indicating that Router 1 is down; the event is provided in different formats depending on whether SNMP, trapper, or syslog elements of the device are used for generating the event. When the Event Normalization—Layer 2 receives the event, it converts the event into a canonical format, a process referred to hereinafter as "normalizing an event". Therefore, the normalized event will have the same format regardless of what facility initially generates the event.

The Event Binding—Layer 3, receives a normalized event from Layer 2, determines which managed object in Inventory 150 represents the entity at which the event occurred at, and binds the event to that managed object. Continuing the example of Router 1 generating a router down event, the event may comprise information such as an IP address of Router 1, which is used to determine the managed object identifier for the managed object that represents Router 1. Layer 2 binds the event to the managed object that represents Router 1, based on the managed object identifier.

The Condition Determination—Layer 4 receives a bound event from Layer 3 and determines an overall condition of an entity based on observable criteria associated with the event that occurred at the entity. For example, an observable indicator, such as CPU Utilization, may have different observable criteria, such as 90% utilized, 90% to 60% utilized, or below 60% utilized. CPU utilization of 90% may be designated as DEGRADED, CPU utilization between 90% and 60% may be designated as BUSY, and CPU utilization under 60% may be designated as GOOD. If the observable criteria for this particular CPU shows that it is 95% utilized, then the overall condition of this particular CPU is DEGRADED.

According to one embodiment, a finite state machine is associated with an entity, such as a router, a link, or a client. The finite state machine is comprised of states that correspond to observable criteria, such as DEGRADED CPU Utilization, BUSY CPU Utilization, and GOOD CPU Utilization. According to one embodiment, the current state of the finite state machine is transmitted from one state (the "old state") to another state (the "new state") as information concerning the condition of an entity arrives at the Condition Determination—Layer 4. For purposes of explanation of a clear example, assume that the finite state machine associated with a particular CPU has three states, one state for DEGRADED, one state for BUSY, and one state for GOOD. Information coming into the Condition Determination—Layer 4 is used to determine the new state of the finite state machine. For example, if the finite state machine is in the DEGRADED state, and information arrives indicating the CPU utilization is 91% utilized, then the state of the finite state machine remains the same. However, if information arrives indicating that the CPU utilization is 90% to 60%, or below 60%, then the state of the finite state machine is changed. For example, if information arrives indicating that the CPU utilization has moved to 88%, then the new state will be BUSY. According to one embodiment, detecting state changes within a certain time interval can be used to detect an unsolved and/or reoccuring problem. For example, the fact that a particular state is re-entered several times within a short period of time can be used to filter out redundant events.

According to one embodiment, one finite state machine is associated with a particular entity and is used in computing the overall condition of that particular entity. According to another embodiment, there is one finite state machine associated with each observable indicator of an entity. For example, a particular entity, such as a router, may have several observable indicators, such as CPU utilization, disk utilization, and throughput, etc. A finite state machine may be associated with each of these observable indicators. According to one embodiment, states of all of the finite state machines for all of the observable indicators of a particular entity may be used to derive the overall condition of the particular entity in question. For example, if the CPU utilization of a router is good, and the disk utilization of the router is good, but the router is down, then the overall condition of the router may be derived as down even though the CPU utilization and the disk utilization are good. Various algorithms may be used to combine state values of multiple state machines to derive a single overall condition value.

The Impact Analysis—Layer 5 receives an overall condition value and determines the impact of the overall condition associated with a primary entity on other entities that are related to the primary entity ("related entities"). According to one embodiment, one or more of the related entities are dependent ("dependent entities") on the primary entity. For example, if the overall condition of Router 1 is poor because its CPU Utilization is high and its disk utilization is high, then all of the entities that depend on Router 1, e.g., Links L4 and L5, Clients 1 and 2, are impacted. According to one embodiment, one or more of the related entities are children ("children entities") of the primary entity.

According to one embodiment, an emit function uses a set of managed objects to determine the impact of an overall condition for a particular entity on managed objects that represent dependent entities. Once the emitted state is determined, then the emitted state is applied to the dependent entities.

The Notification—Layer 6 receives an impact determination from Layer 5 and creates alarms that indicate the dependent entities are impacted by the event. For example, if a particular event is the first event indicating an entity is having problems, then an alarm is created. If a subsequent event indicates the same entity is having a problem, then an update alarm is created. According to one embodiment, a finite state machine is associated with the alarms to track their status.

The Heuristics—Layer 7 receives alarms from Layer 6 and creates annotated alarms. For example, if Router 3 fails, then Routers 1 and 2 may also generate events of their own, resulting in alarms at Layer 6. Heuristics may be used to determine that the alarms resulting from events generated by Routers 1 and 2 are related to an alarm resulting from an event generated by Router 3. In so doing, annotated alarms are generated. For example, an annotated alarm may comprise an indication that alarms for the failures of Routers 1 and 2 are related to the alarm for the failure of Router 3. According to one embodiment, rules may be used to perform these heuristics. According to another embodiment, artificial intelligence may be used to perform these heuristics. According to one embodiment, the Heuristics—Layer 7 may be customized for example, by each installation. According to one embodiment, the Heuristics—Layer 7 may be configured.

According to one embodiment, each layer subscribes to information provided by a lower layer, and each layer provides information to a higher layer. For example, Layer 2 provides normalized events and Layer 3 subscribes to normalized events, Layer 3 provides bound events and Layer 4 subscribes to bound events, and so on.

3.2 Message Transport—Layer 1

Figure 1C:
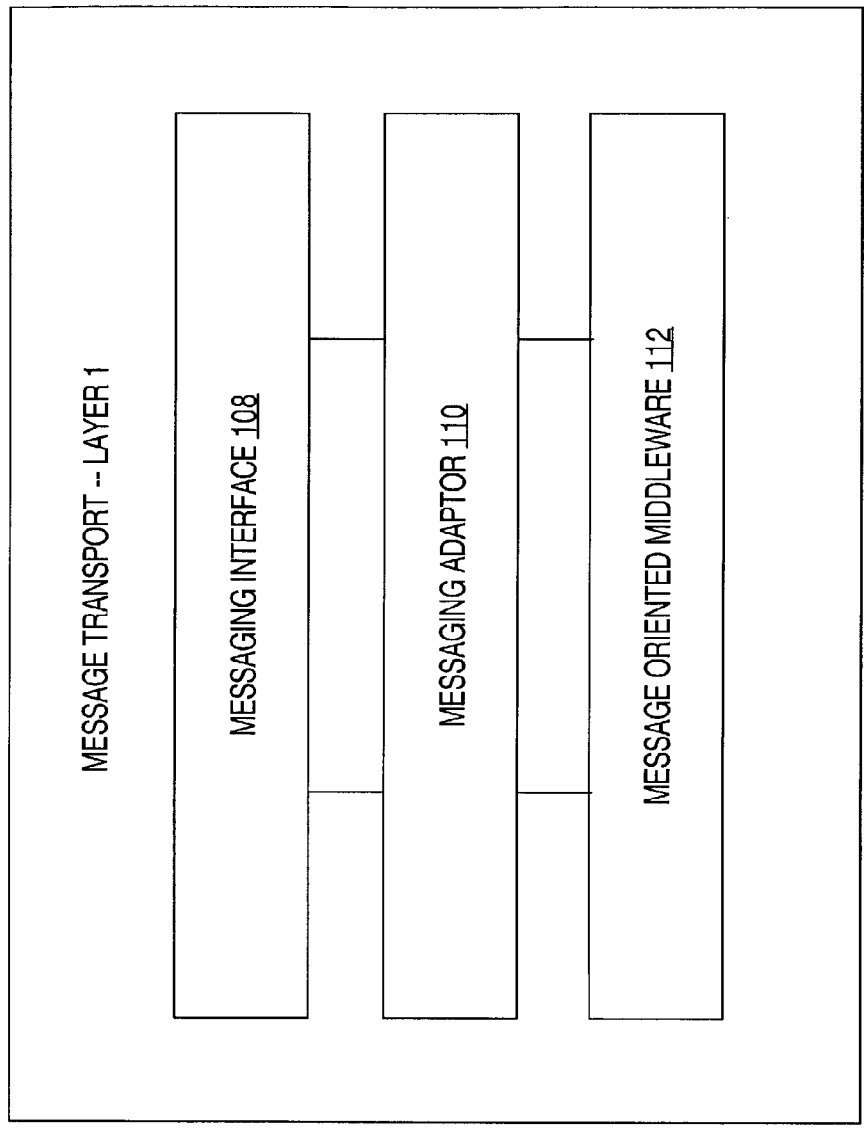
FIG. 1C is a block diagram that illustrates the message transport layer.

FIG. 1C is a block diagram that illustrates the message transport layer, according to one embodiment.

According to one embodiment, the Message Transport—Layer 1 comprises Message Oriented Middleware 112, a Messaging Adaptor 110, and a Messaging Interface 108. According to one embodiment, the Messaging Interface 108 comprises a subscribe method and a publish method that Layers 2 through 7 use to communicate with each other.

The Messaging Adaptor 110 adapts messages directed through Messaging Interface 108 for use with Message Oriented Middleware 112, and is used in the event that Message Oriented Middleware 112 implements functions of some layers in the Event Processor 104 and does not provide messages that are compatible with the Messaging Interface 108. For example, if Message Oriented Middleware 112 provides the functionality of Layers 2 through 4, then the Messaging Adaptor 110 may convert the messages provided by the Message Oriented Middleware 112 into the format that is used by the Messaging Interface 108. However, if the Message Oriented Middleware 112 provides messages in a format that is compatible with the Messaging Interface 108, then the Messaging Adaptor 110 is not needed.

The Message Oriented Middleware 112 comprises software that delivers events at an application level. An example is a Java Messaging Service (JMS) implementation, or an event bus system such as the Information Bus available from TIBCO.

3.3 The Inventory

Figure 1D:
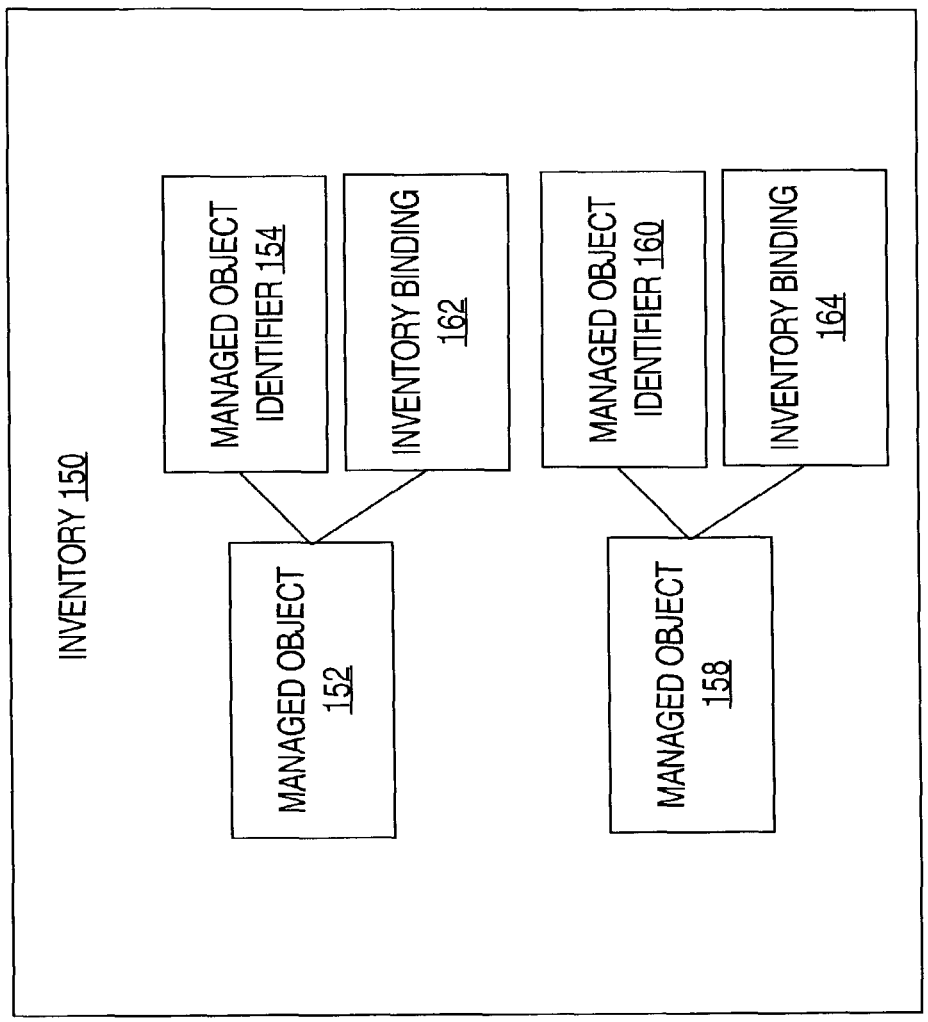
FIG. 1D is a block diagram of an inventory.

FIG. 1D is a block diagram of an inventory, according to one embodiment. Inventory 150 comprises Managed Objects 152 and 158, which represent entities on a Network 101, Managed Object Identifiers 154 and 160, and Inventory Bindings 162 and 164. For example Managed Object 152 may represent Router 1 and Managed Object 158 may represent Link L3. Furthermore, Managed Object Identifier 154 is a unique value that identifies Managed Object 152 and Managed Object Identifier 160 is a unique value that identifies Managed Object 158.

Inventory Bindings 162 and 164 comprise one or more network identifiers, such as an IP address and a MAC address, for entities on the network. For example, Inventory Binding 162 may comprise, among other things, the IP address of Router 1 or the MAC address of Router 1. According to one embodiment, the Inventory Bindings 162 and 164 are used to determine the managed object identifier for a particular managed object.

Inventory 150 may comprise an existing inventory database that is provided as part of Network Management System 102. For example, when Network Management System 102 is Cisco Resource Management Essentials from Cisco Systems, Inc., Inventory 150 may be the RME inventory database.

For purposes of illustrating a clear example, Inventory 150 is shown with a limited number of constituent objects; however, in a system, there may be a number of such objects.

Figure 1E:
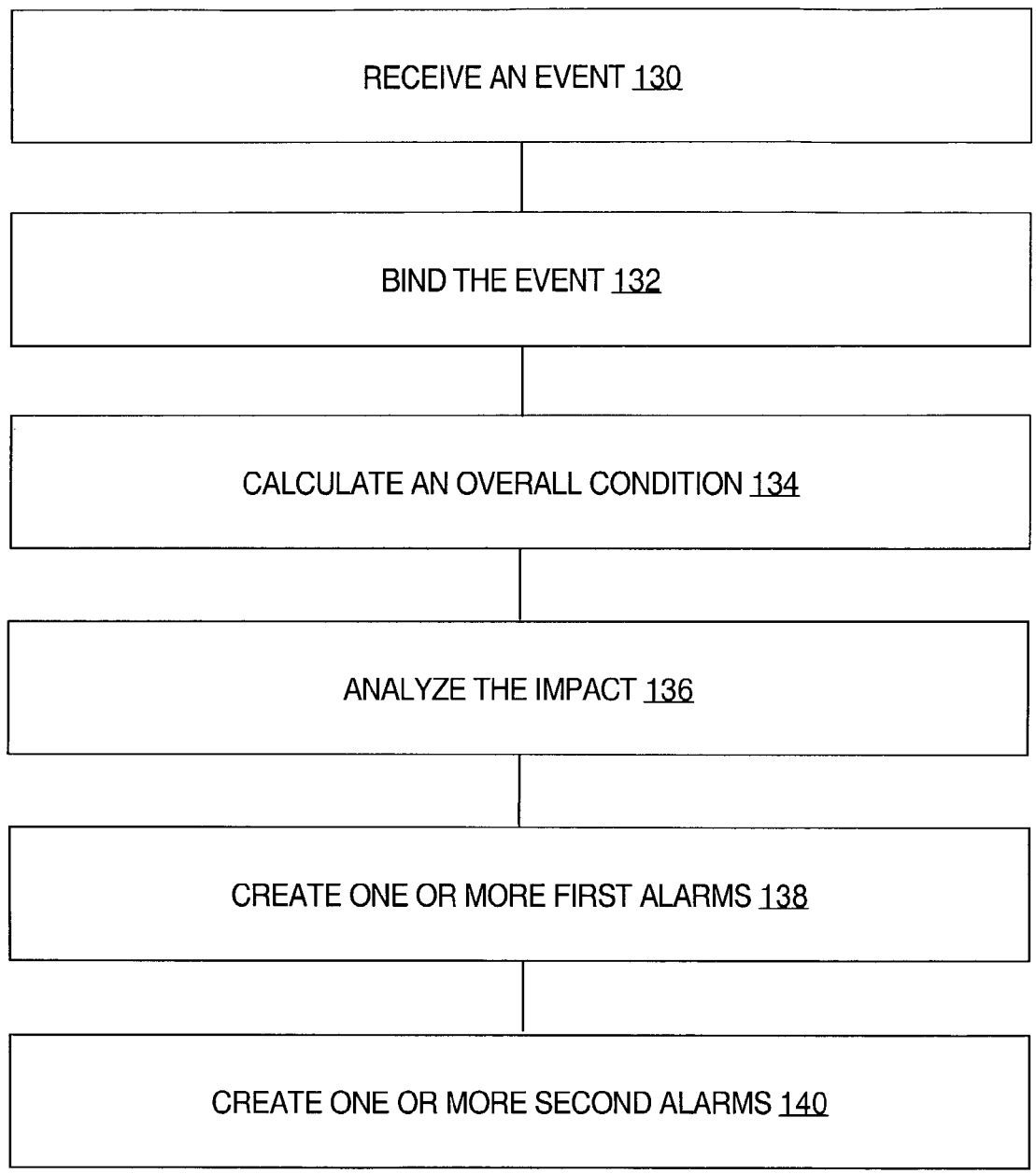
FIG. 1E is a flow diagram that illustrates a high level overview of one embodiment of a method for providing notification of network alarms using a plurality of distributed layers.

4.0 METHOD OF PROVIDING NOTIFICATION OF NETWORK ALARMS USING A PLURALITY OF DISTRIBUTED LAYERS 4.1 Process of Providing Notification of Network Alarms Using a Plurality of Distributed Layers FIG. 1E is a flow diagram that illustrates a high level overview of one embodiment of a method for providing notification of network alarms using a plurality of distributed layers. For the purpose of explanation, FIG. 1E is described with reference to the structures depicted in FIG. 1A and FIG. 1B. However, other structures may be used besides those depicted in FIG. 1A and FIG. 1B.

At step 130, a message is received that indicates an event occurred at a primary entity. In this context, a "primary entity" is any network element that generates events, such as a switch, router, etc. For example, an event, such as "router down", occurs at a router, such as Router 2, which results in a Message Transport—Layer 1 receiving a message, that indicates the event occurred at Router 2.

At step 132, the event is bound to a managed object, which represents the primary entity and is stored in an inventory, to create a bound event. For example, at the Event Normalization—Layer 2, the router down event is bound to a managed object, such as Managed Object 158, which represents Router 2. The event is bound with a unique value that identifies Router 2, such as the Managed Object Identifier 160, to create a Bound Event 316.

At step 134, an overall condition is determined for the primary entity, based at least in part on the bound event, to create one or more condition notifications. For example, at the Condition Determination—Layer 4, an Overall Condition 418 is determined for Router 2, based at least in part on the Bound Event 316.

At step 136, the impact of a particular condition notification on one or more entities, which are related to the primary entity, is analyzed to create one or more impact notifications. For example, at the Impact Analysis—Layer 5, the impact of a particular Condition Notification 418, on one or more entities, such as entities associated with the Set Of Dependent Managed Objects 506, is analyzed to create one or more impact notifications, such as Impact Notification 508.

At step 138, one or more first alarms, which indicate the one or more related entities are impacted by a particular impact notification, are created. For example, the Notification—Layer 6 creates one or more first alarms, such as Old Alarm 608 or Updated Alarm 607, which indicate that the Set Of Dependent Managed Objects 506 are impacted by the Impact Notification 508.

At step 140, one or more second alarms are created based on the one or more first alarms. For example, the Heuristics—Layer 7 creates one or more second alarms, such as Annotated Alarm Set 709.

In the following sections, block diagrams are used to illustrate structures for the layers of the Event Processor 104, according to one embodiment. The discussions of the block diagrams are followed by discussions of flow diagrams, according to one embodiment, for event handlers that are associated with the layers of the Event Processor 104. For the purposes of explanation, assume that an event indicating that Router 2 is down is transmitted to the Event Processor 104 using SNMP, that Managed Object 158 represents Router 2, and that Inventory Bindings 164 comprises the IP address of Router 2, and the MAC address of Router 2. The Managed Object Identifier 160 is a value that uniquely identifies the Managed Object 158 in Inventory 150.

4.2 Process of Normalizing Events

Figure 2A:
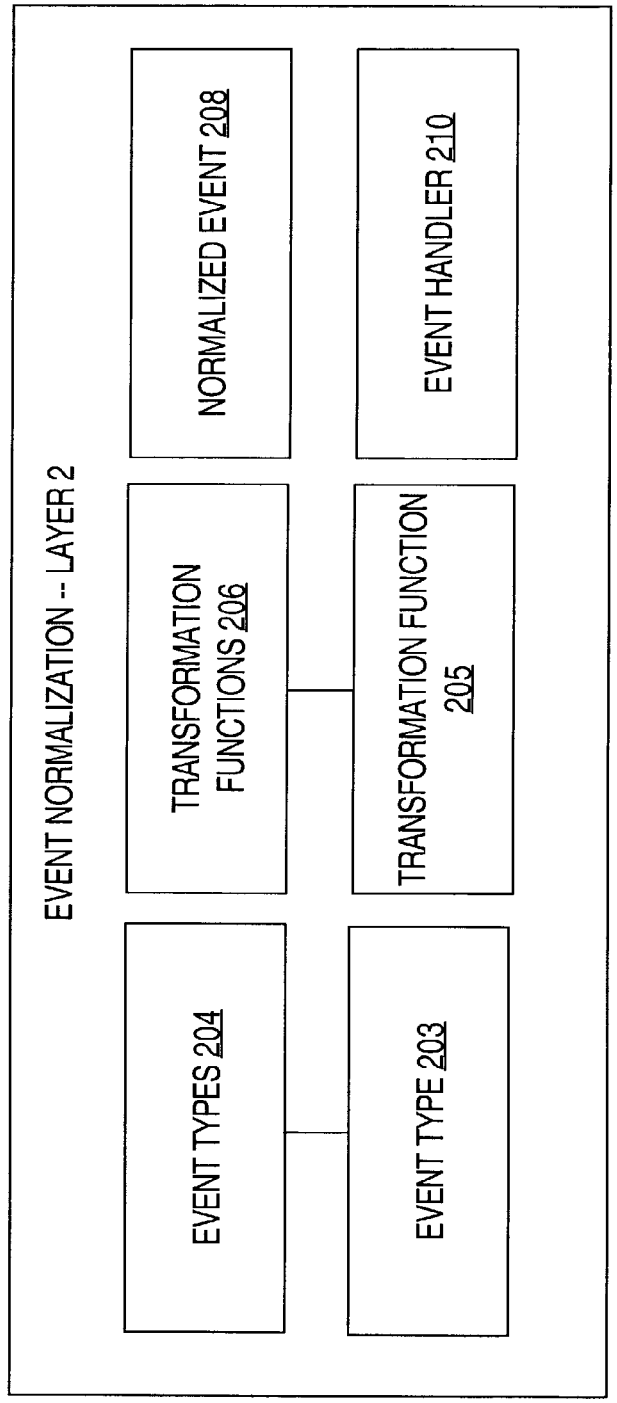
FIG. 2A is a block diagram that illustrates structures associated with the Event Normalization—Layer 2.

FIG. 2A is a block diagram that illustrates structures associated with the Event Normalization—Layer 2. Event Types 204 is a set of one or more event types, such as Event Type 203, for which the Event Normalization—Layer 2 listens. Transformation Functions 206 is a set of one or more transformation functions, such as Transformation Function 205, that are used to normalize events for each type in event types 204. Normalized Event 208 is an event that has been normalized into a standard or canonical format. According to one embodiment, Event Handler 210 performs the logic depicted in FIG. 2B and may be any object, method, program, routine, or process that can perform such logic.

Figure 2B:
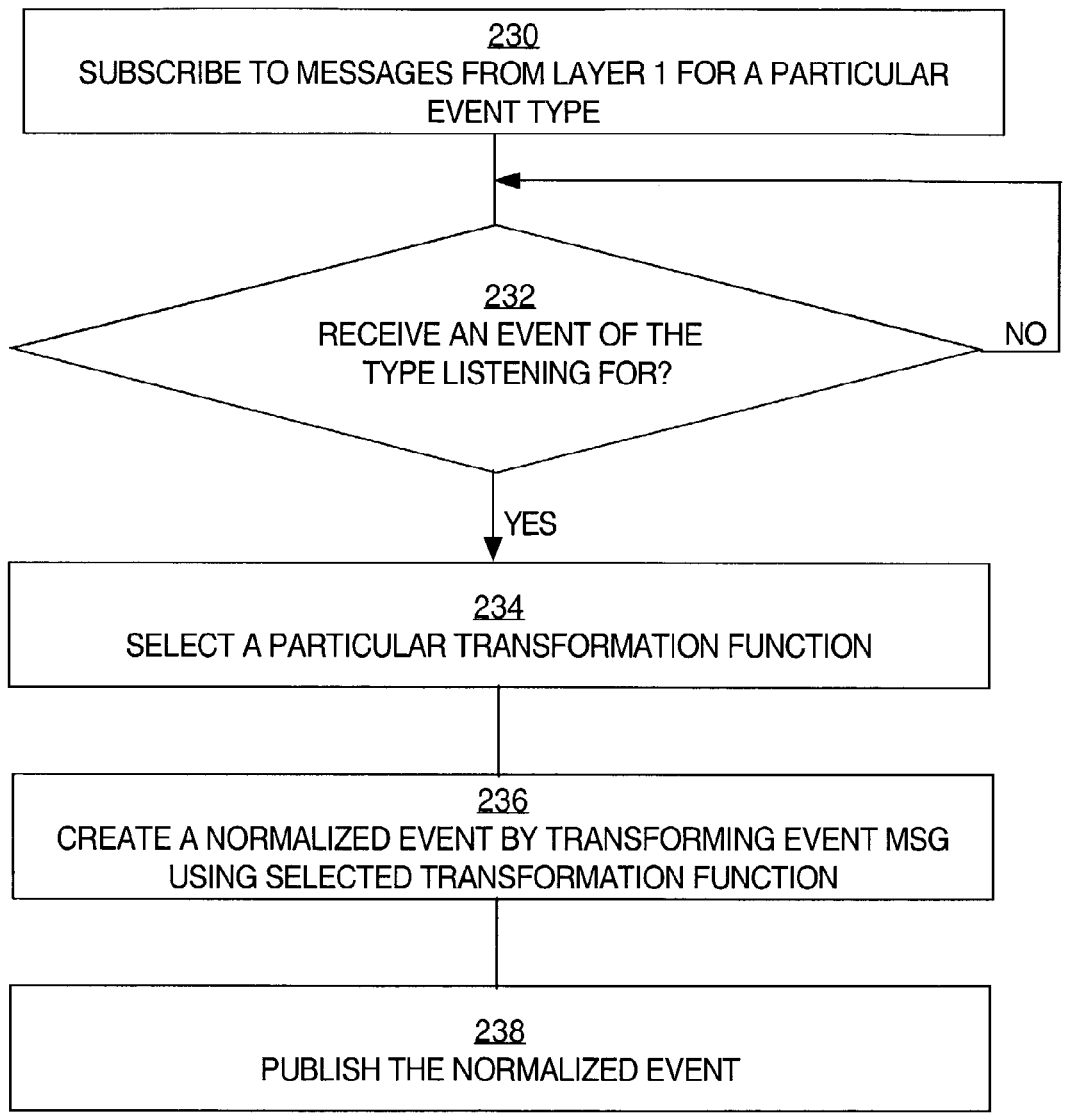
FIG. 2B is a flow diagram that illustrates a high level overview of one embodiment of a method performed by the Event Normalization—Layer 2.

FIG. 2B is a flow diagram that illustrates a high level overview of one embodiment of a method performed by the Event Normalization—Layer 2. For the purposes of explanation, assume that the Event Type 203 is a router down event type. At step 230, the Event Handler subscribes to messages that are published by Layer 1 for a particular type of event. For example, the Event Types 204 comprises an Event Type 203 and Event Handler 210 subscribes to listen to messages of the Event Type 203, e.g., router down.

At decision box 232, the Event Handler waits until it receives an event for an event type it is listening for. For example, Event Handler 210 is listening for events that indicate routers are down. Once Event Handler 210 receives the event indicating that Router 2 is down, e.g., Event Type 203. Event Handler 210 proceeds to step 234, where Event Handler 210 uses Event Type 203 to select a particular transformation function, such as Transformation Function 205, which can normalize events from the SNMP format to a canonical format.

At step 236, the Event Handler creates a normalized event. For example, the Event Handler 210 uses the Transformation Function 205 to create a Normalized Event 208. At step 238, the Event Handler publishes the normalized event. For example, the Event Handler 210 publishes the Normalized Event 208 using a message format compatible with Layer 1.

4.3 Process of Binding Events

Figure 3A:
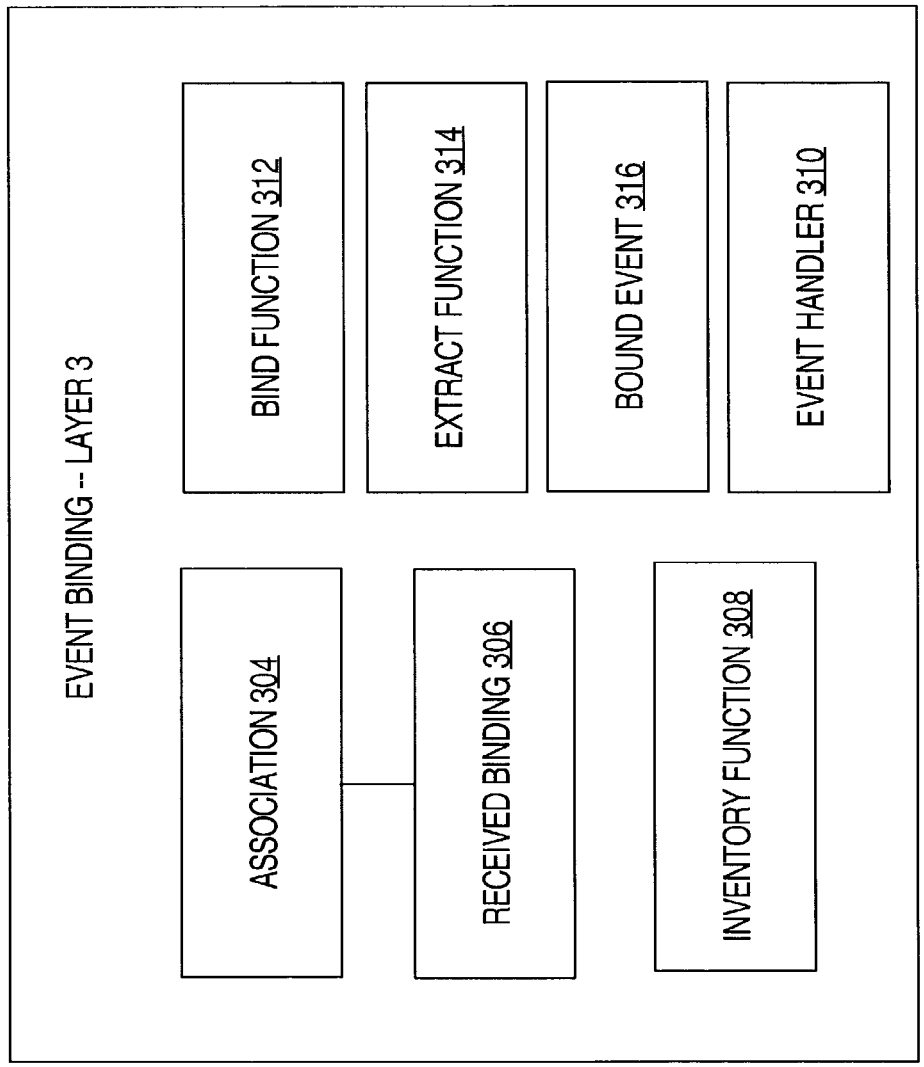
FIG. 3A is a block diagram that illustrates structures associated with the Event Binding—Layer 3.

FIG. 3A is a block diagram that illustrates structures associated with the Event Binding—Layer 3.

An Association 304 is a name, value pair used for identifying the entity where an event occurred. For example, an Association 304 may have a value for a IP address or a MAC address with a name that describes the value, such as <IP address, 128.22.22.01> or <MAC address, 0123456789ABCDEF>. Received Binding 306 is a set of one or more associations, such as Association 304, which are received from a particular entity when an event occurs at the particular entity and are used for identifying the particular entity. For example, a particular router, such as Router 2, may be identified by, among other things, an IP address and a MAC address. For the purpose of explanation, the Received Binding 306 for Router 2 may comprise, among other things, <IP address, 128.22.22.01> and <MAC address, 0123456789ABCDEF>.

The Inventory Function 308 is a function that receives the Received Binding 306 for a particular entity and returns a managed object identifier. For example, the Inventory Function 308 can receive the Received Binding 306 that identifies Router 2, compare Received Binding 306 to an Inventory Binding, such as Inventory Binding 164, and return a managed object identifier, such as the Managed Object Identifier 160. Bind Function 312 receives a Normalized Event 208, and a Managed Object Identifier, such as Managed Object Identifier 160, and returns a Bound Event 316. Extract Function 314 receives a Normalized Event 208, extracts and returns Received Binding 306 from that Normalized Event 208. A Bound Event 316 is a Normalized Event 208, which has been associated with a Managed Object Identifier, such as Managed Object Identifier 154. According to one embodiment, Event Handler 310 performs the logic depicted in FIG. 3B.

Figure 3B:
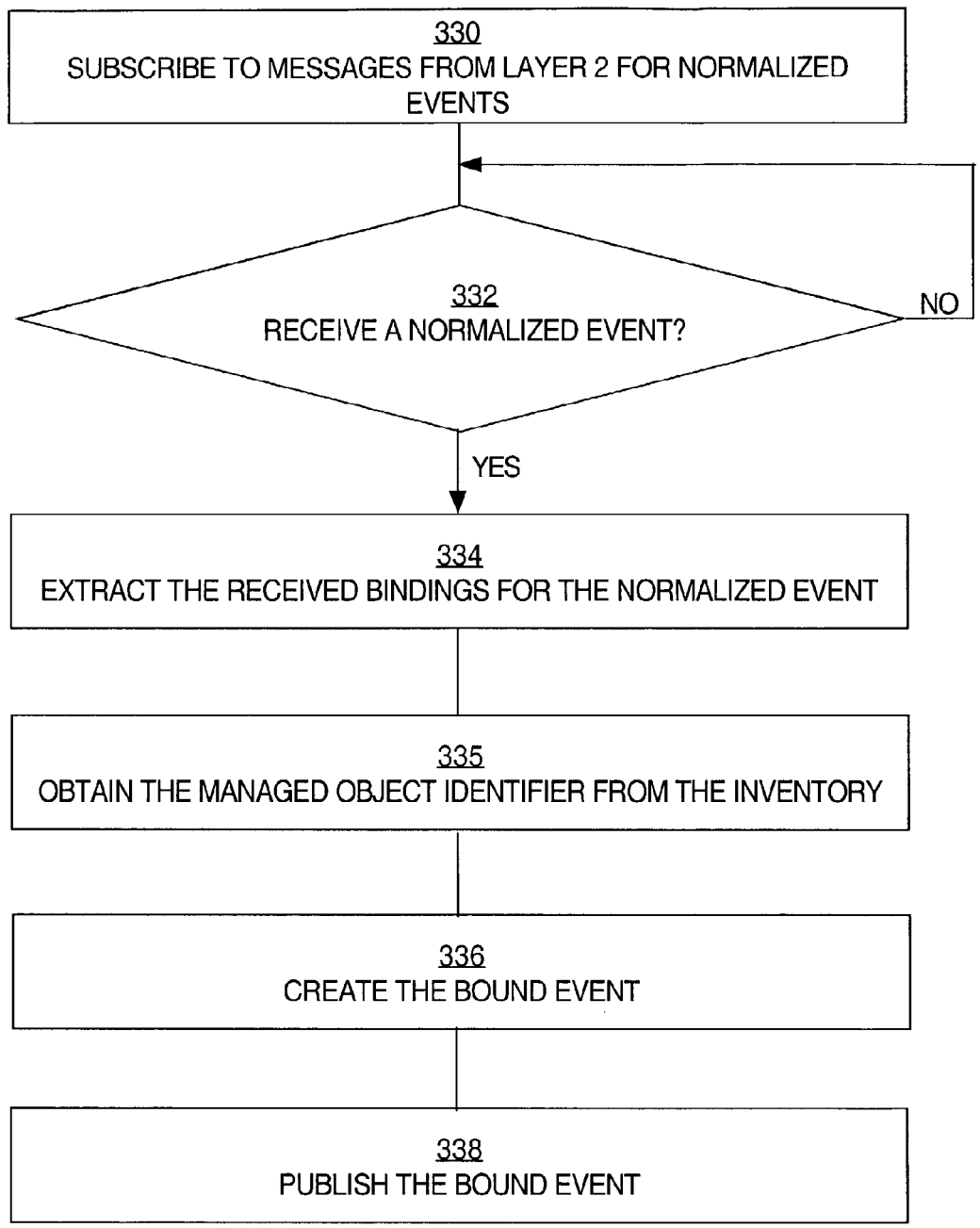
FIG. 3B is a flow diagram that illustrates a high level overview of one embodiment of a method performed by the Event Binding—Layer 3.

FIG. 3B is a flow diagram that illustrates a high level overview of one embodiment of a method performed by the Event Binding—Layer 3. At step 330, the Event Handler subscribes to messages for normalized events. For example, the Event Handler 310 subscribes to messages that are conveyed by Layer 1 and issued by Layer 2 for the Normalized Event 208, which indicates Router 2 is down.

At the decision box 332, the Event Handler waits until it receives a normalized event. For example, the Event Handler 310 waits until it receives the Normalized Event 208.

Once a normalized event arrives, the Event Handler proceeds to step 334 where it extracts the received binding for the normalized event. For example, the Event Handler 310 proceeds to step 334, where the Event Handler 310 invokes the Extract Function 314 by passing the Normalized Event 208 as a parameter and the Extract Function 314 returns Received Binding 306 from the Normalized Event 208.

At step 335, the Event Handler obtains the managed object identifier from the inventory. For example, the Event Handler 310 invokes the Inventory Function 308 by passing the Received Binding 306 as a parameter and the Inventory Function 308 returns the Managed Object Identifier 160 from the Inventory 150. Inventory Function 308 may use any query or retrieval mechanism that is compatible with Inventory 150.

At step 336, the Event Handler creates the bound event. For example, the Event Handler 310 invokes the Bind Function 312 by passing the Normalized Event 208 and the Managed Object Identifier 160 as parameters, and the Bind Function 312 returns the Bound Event 316. In so doing, the Normalized Event 208 is bound to the Managed Object 158.

At step 338, the Event Handler publishes the bound event. For example, the Event Handler 310 publishes the Bound Event 316 to Layer 1 using a compatible message format.

4.4 Process of Providing Condition Determination

Figure 4A:
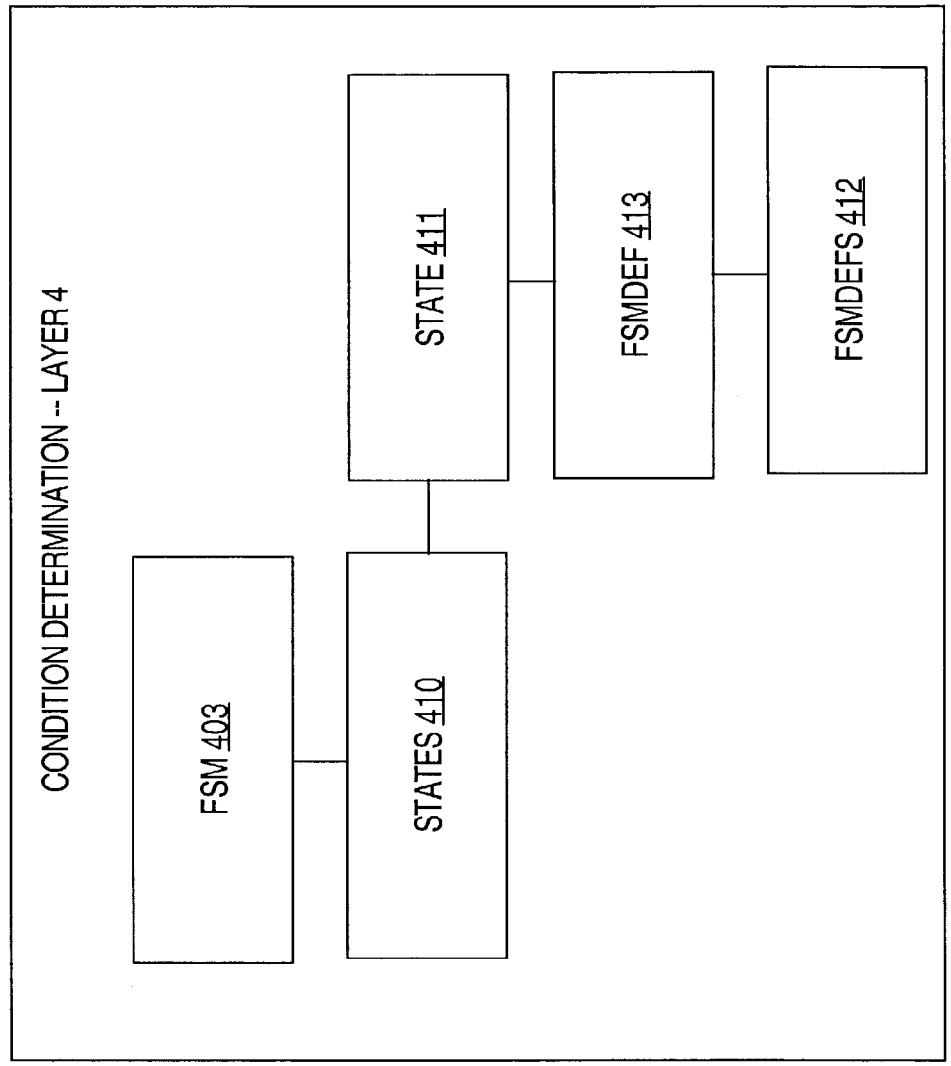
FIG. 4A and FIG. 4B are block diagrams that illustrate structures associated with the Condition Determination—Layer 4.
Figure 4B:
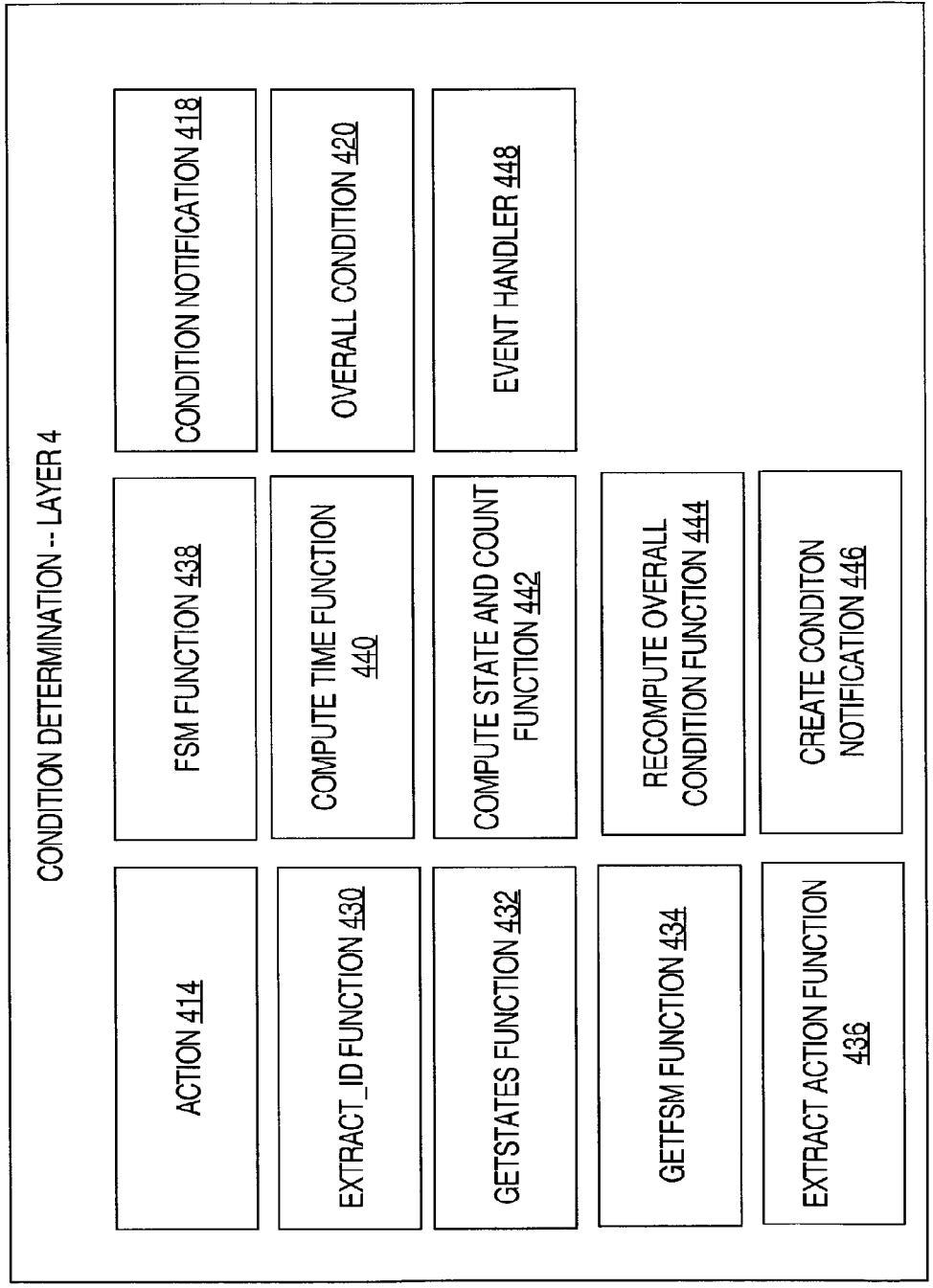

FIG. 4A and FIG. 4B are block diagrams that illustrate structures associated with the Condition Determination—Layer 4.

Referring first to FIG. 4A, FSM 403 is a finite state machine comprising States 410. According to one embodiment, FSM 403 comprises one finite state machine that is associated with a particular entity, such as a router. According to another embodiment, the FSM 403 comprises one or more finite statement machines that are associated with various observable indicators, such as CPU utilization, disk utilization, throughput, that are associated with a particular entity, such as a router.

State 411 represents a particular state in States 410. For example, States 410 may comprise one or more states, such as State 411, that represent observable criteria, such as Router 2 is down or Router 2 is up. FSMDEF 413 is a finite state machine definition; one FSMDEF 413 is associated with each State 411. FSMDEFS 412 is the set of all finite state machine definitions that correspond to the states in States 410.

Referring now to FIG. 4B, according to one embodiment, two values are associated with Action 414—"compute" the new state in States 410 for the FSM 403, or "set" the new state for the FSM 403. Extract_ID Function 430 is a function that returns a managed object identifier, such as Managed Object Identifier 160, given a bound event, such as Bound Event 316. Getstates Function 432 returns a set of states, such as States 410, given a managed object identifier, such as Managed Object Identifier 160. Getfsm Function 434 returns a particular FSM definition that corresponds to a particular state. For example, Getfsm Function 434 returns FSMDEF 413, which corresponds to State 411. Extract Action Function 434 returns an action, such as Action 414, associated with a Bound Event, such as Bound Event 316.

FSM Function 438 returns the finite state machine, such as FSM 403, associated with a particular managed object, such as Managed Object 158. Compute Time Function 440 computes the length of time that was spent in a particular state, such as State 411. Compute State and Count Function 442 computes the new state and the new count given the Action 414, the FSMDEF 413, the old state, e.g., State 411, the newly computed time, and the old count. According to one embodiment, the number of times a state, such as old state, e.g. State 411, is entered is counted. Recompute Overall State Function 444 recomputes the Overall Condition 420 for a particular managed object, such as Managed Object 158, using the a managed object identifier, such as Managed Object Identifier 160.

Create Condition Notification 446 creates a condition notification, such as Condition Notification 418, given the Action 414, the old state, e.g., State 411, the FSMDEFS 412, the Managed Object Identifier 160, the Bound Event 316, and the Overall Condition 420.

According to one embodiment, one or more of FSM 403, States 410, FSMDEFS 412, State 411, FSMDEF 413, Condition Notification 418, and Overall Condition 420, may be maintained in the Inventory 150. According to one embodiment, Event Handler 448 performs the logic depicted in FIG. 4C, FIG. 4D, FIG. 4E, and FIG. 4F.

FIG. 4C, FIG. 4D, FIG. 4E, and FIG. 4F are flow diagrams that illustrate a high level overview of one embodiment of a method performed by the Condition Determination—Layer 4. For the purposes of explanation, assume that the FSM 403 is a finite state machine associated with Router 2 and that State 411 indicates that Router 2 is down.

Figure 4C:
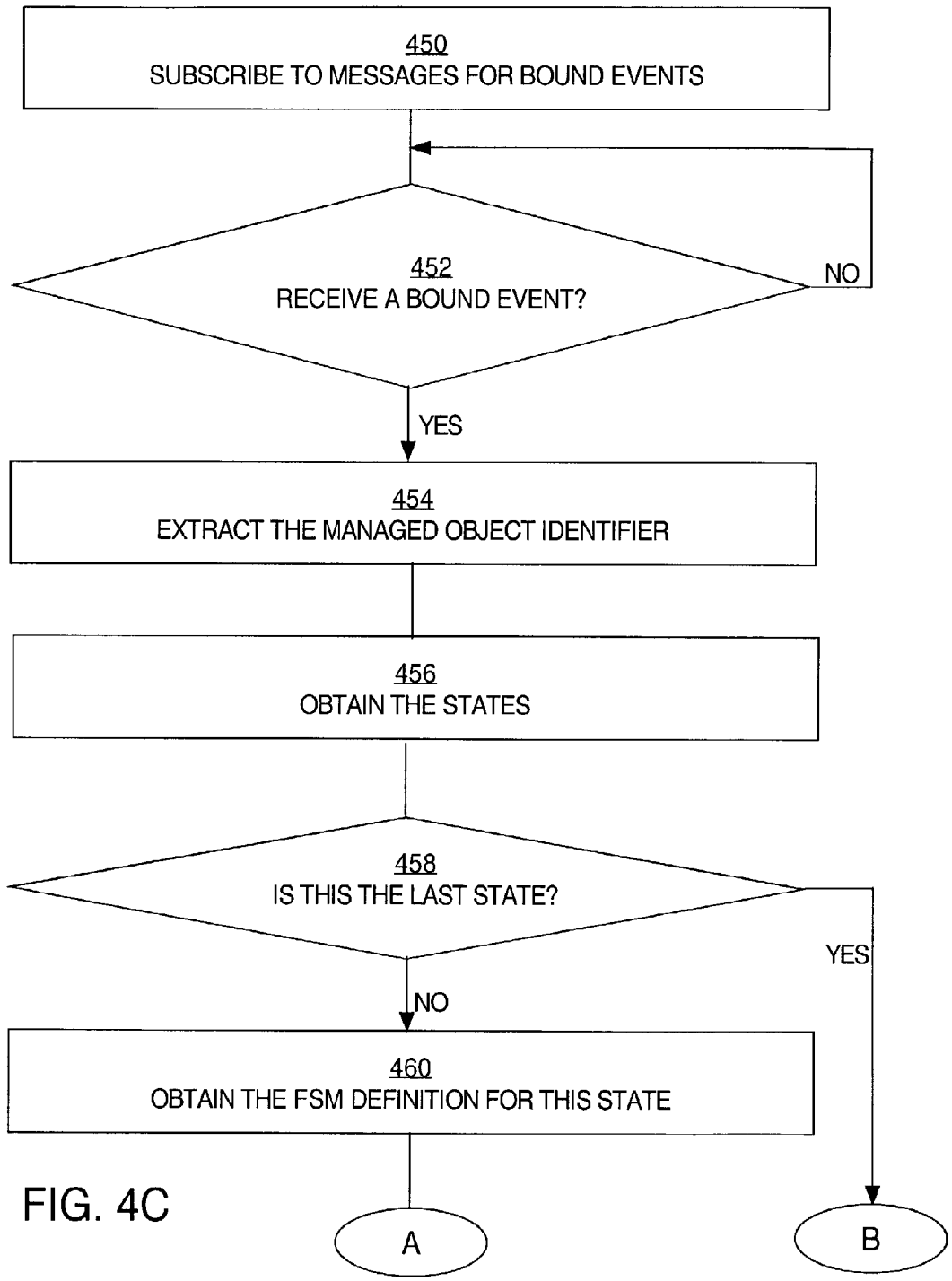
FIG. 4C, FIG. 4D, FIG. 4E, and FIG. 4F are flow diagrams that illustrate a high level overview of one embodiment of a method performed by the Condition Determination—Layer 4.

Referring first to FIG. 4C, at step 450, the Event Handler subscribes to messages for bound events. For example, the Event Handler 448 subscribes to messages for the Bound Event 316 that are transported by Layer 1 and originally issued by Layer 3.

At the decision box 452, the Event Handler waits until it receives a bound event. For example, the Event Handler 448 waits until it receives the Bound Event 316.

Once the bound event arrives, the Event Handler proceeds to step 454 where it extracts the managed object identifier from the bound event. For example, the Event Handler 448 proceeds to step 454, where the Event Handler 448 invokes the Extract_ID Function 430 by passing the Bound Event 316 as a parameter, and the Extract_ID Function 430 returns the Managed Object Identifier 160.

At step 456, the Event Handler obtains the States of an FSM associated with the current managed object. For example, the Event Handler 448 invokes the Getstates Function 432 by passing the Managed Object Identifier 160 and the Getstates Function 432 returns the States 410.

Steps 458, 460, 462, and 464 form a loop that processes each state in States 410. The following description of this loop describes the first iteration of the loop and therefore, the current state that is being processed in the loop is the old state and the next state is the new state. At decision box 458, a determination is made as to whether there are unprocessed states in States 410. If there are any unprocessed states in States 410, steps 460, 462, and 464 are executed. Otherwise, processing proceeds to step 466.

At step 460, the FSM definition for the state is obtained. For example, the FSMDEF 413 that corresponds to the old state, e.g., State 411, is obtained.

Figure 4D:
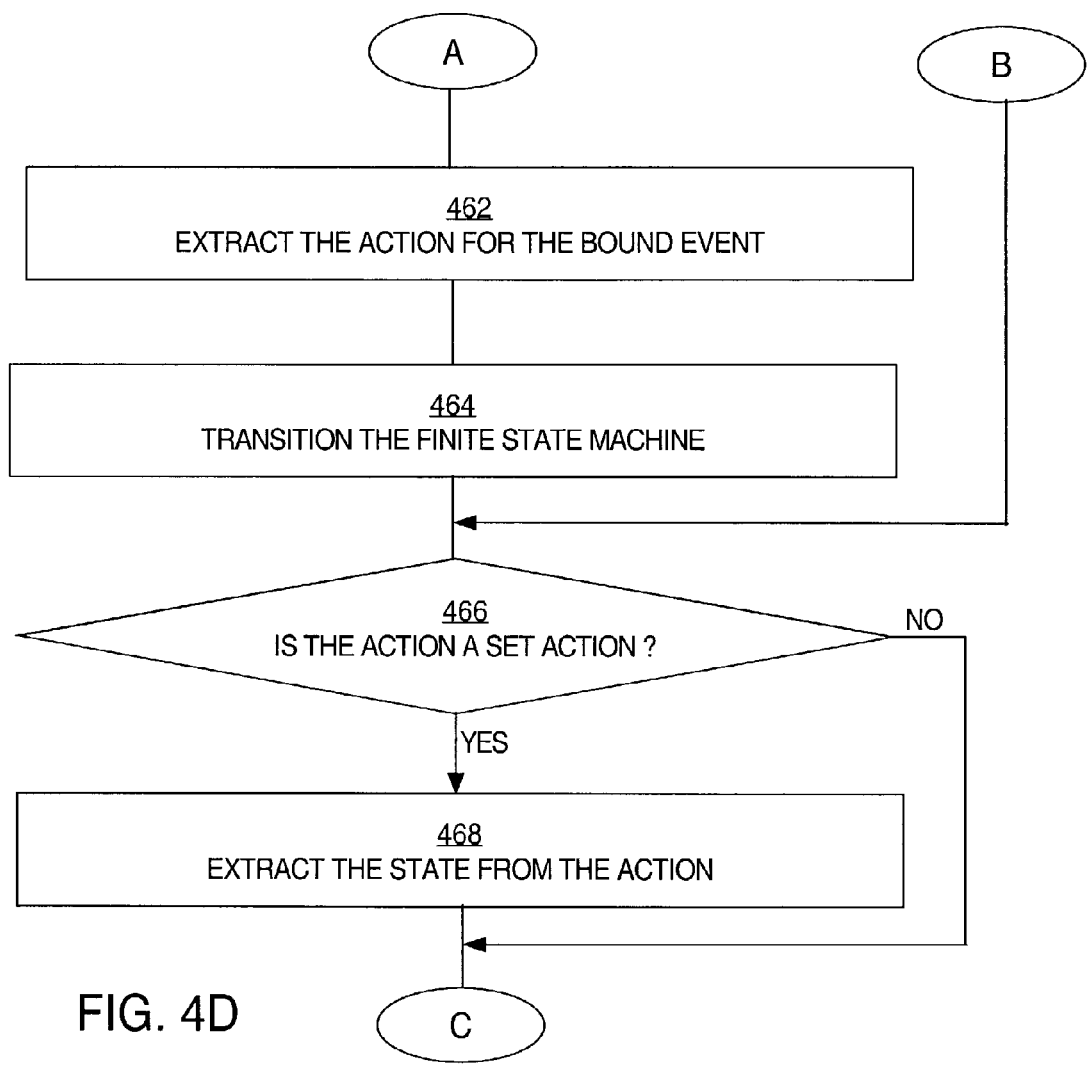

Referring now to FIG. 4D, at step 462, the Event Handler extracts the action from the bound event. For example, the Event Handler 448 invokes the Extract Action Function 436 by passing the Bound Event 316 as a parameter, and the Extract Action Function 436 returns the Action 414.

At step 464 the Event Handler transitions the finite state machine. For example, the Event Handler 448 invokes the FSM Function 438 by passing the Action 414, the old state, e.g., State 411, the FSMDEF 413, the Managed Object Identifier 160, and the Bound Event 316. The FSM Function 438 transitions the state of the FSM 403 to the new state.

At decision box 466, a decision is made as to whether the action indicates a set action. For example, the Event Handler 448 determines whether Action 414 indicates that a "set" action is to be performed, in which case processing proceeds to step 468. Otherwise, processing proceeds to decision box 470.

At step 468, the Event Handler extracts the state from the action. For example, if the event, that indicates that Router 2 is down was transmitted to Event Processor 104 by a third party network management system, then according to one embodiment, the Action 414 indicates the new state to which the FSM 403 is to be set to. In so doing, the Event Handler 448 extracts the new state from the Action 414.

Figure 4E:
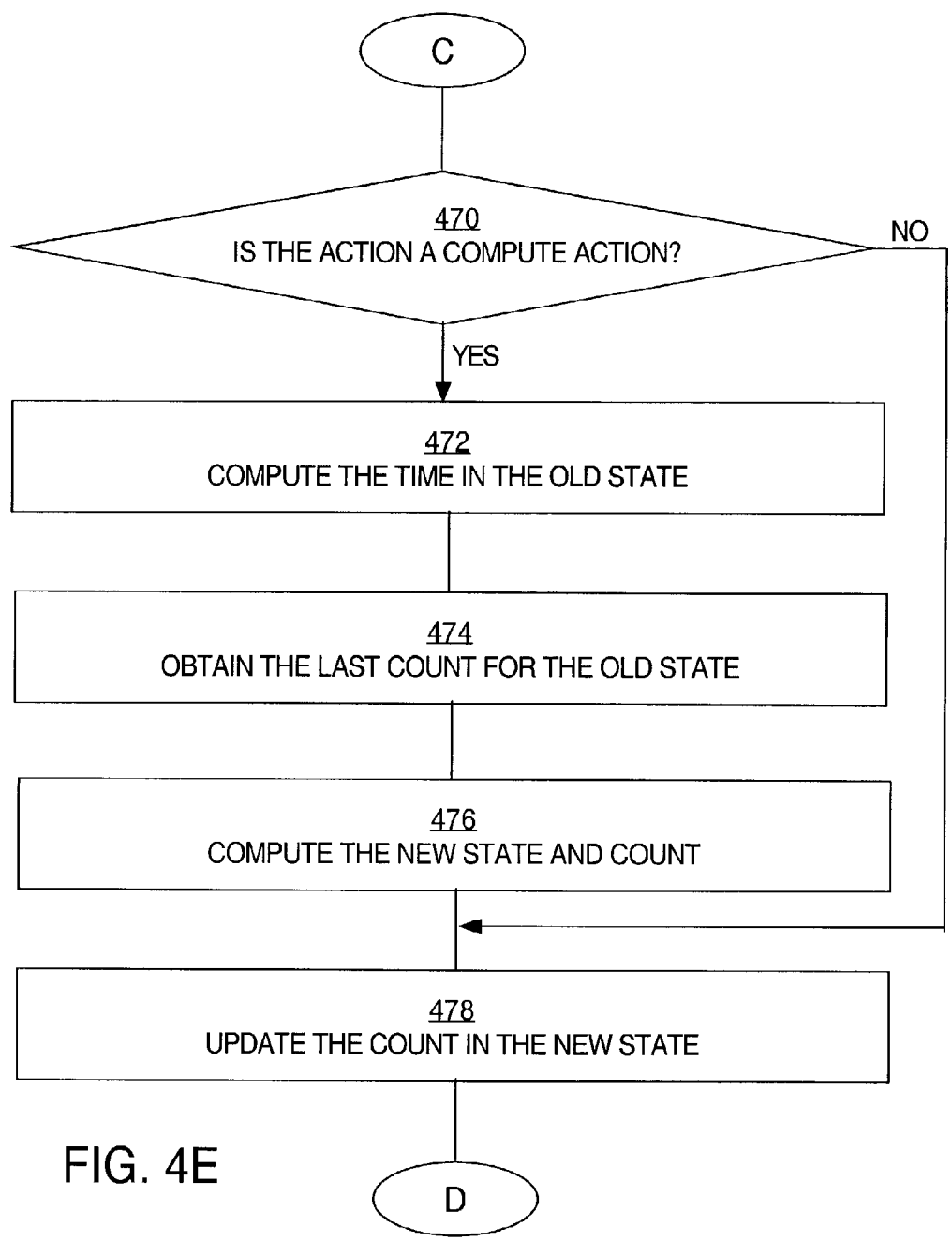

Referring now to FIG. 4E, at decision box 470, a decision is made as to whether the action indicates a compute action. For example, the Event Handler 448 determines whether Action 414 indicates that a "compute" action is to be performed, in which case processing proceeds to step 472. Otherwise, processing proceeds to step 478. According to one embodiment, a third party network management system may provide information that is used in the "compute" action.

At step 472, the Event Handler computes the time that was in the old state for later use to determine a new state. For example, the Event Handler 448 invokes the Compute Time Function 440 by passing in the old state, e.g., State 411, and the Compute Time Function 440 returns the amount of time that has been spent in the old state, e.g., State 411.

At step 474, the Event Handler obtains the last count of the number of times the old state was entered. For example Event Handler 448 obtains the last count of the number of times the old state, e.g., State 411, was entered.

At step 476, the Event Handler computes the new state and the new count. For example, the Event Handler 448 invokes the Compute State and Count Function 442 by passing the Action 414, the FSMDEF 413, the old state, e.g., State 411, the time spent in the old state, and the last count from the old state, as parameters. The Compute State and Count Function 442 returns a new state and a new count.

At step 478, the Event Handler updates the count in the new state. For example, the Event Handler 448 updates the count in the new state with the new count.

Figure 4F:
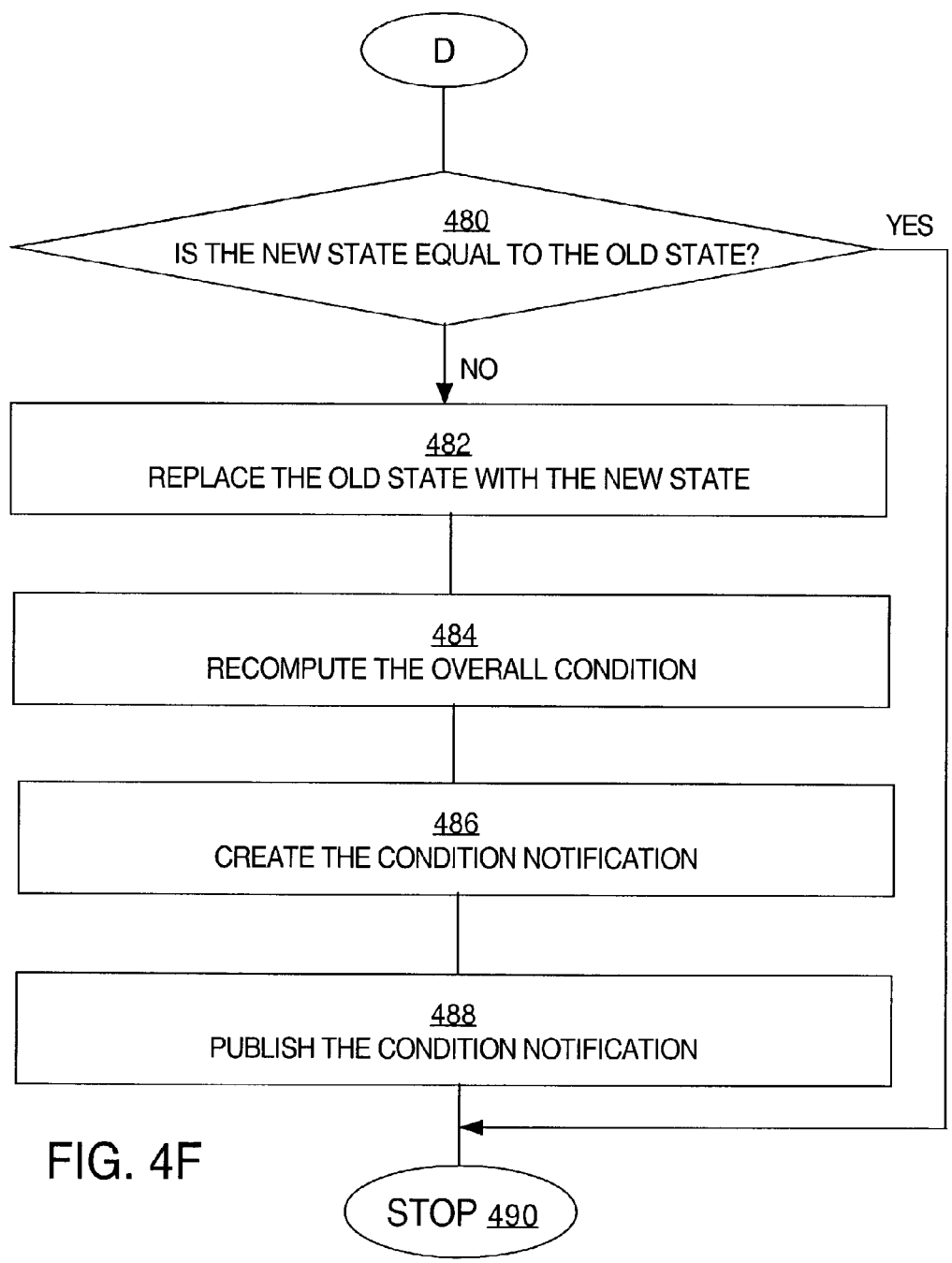

Referring now to FIG. 4F, at the decision box 480, the Event Handler determines whether the new state is the same as the old state. For example, the Event Handler 448 determines if the new state is equal to the old state, e.g., State 411. If the new state is equal to the old state, e.g., State 411, then processing proceeds to step 490. Otherwise, processing proceeds to step 482.

At step 482, the Event Handler replaces the old state with the new state. For example, the Event Handler 448 replaces the old state, e.g., State 411, in the FSM 403 with the new state.

At step 484, the Event Handler recomputes the overall condition of the managed object. For example, the Event Handler 448 invokes the Recompute Overall Condition Function 444 by passing the Managed Object Identifier 160 and a recomputed Overall Condition 420 is returned. According to one embodiment, the recomputed Overall Condition 420 is based upon a FSM 403 that comprises one finite state machine that is associated with a particular entity. According to another embodiment, the recomputed Overall Condition 420 is based upon a FSM 403 that comprises one or more finite statement machines that are associated with various observable indicators, such as CPU utilization, disk utilization, throughput, that are associated with a particular entity, such as a router.

At step 486, the Event Handler creates the condition notification. For example, the Event Handler 448 invokes the Create Condition Notification 446 by passing the Action 414, the new state, the FSMDEF 413, the Managed Object Identifier 160, the Bound Event 316, and the recomputed Overall Condition 420. The Create Condition Notification 446 returns a Condition Notification 418.

At step 488, the Event Handler publishes the condition notification for use by Layer 5. For example, the Event Handler 448 publishes the Condition Notification 418 to Layer 1.

At step 490 processing is complete and control returns.

4.5 Process of Providing Impact Analysis

Figure 5A:
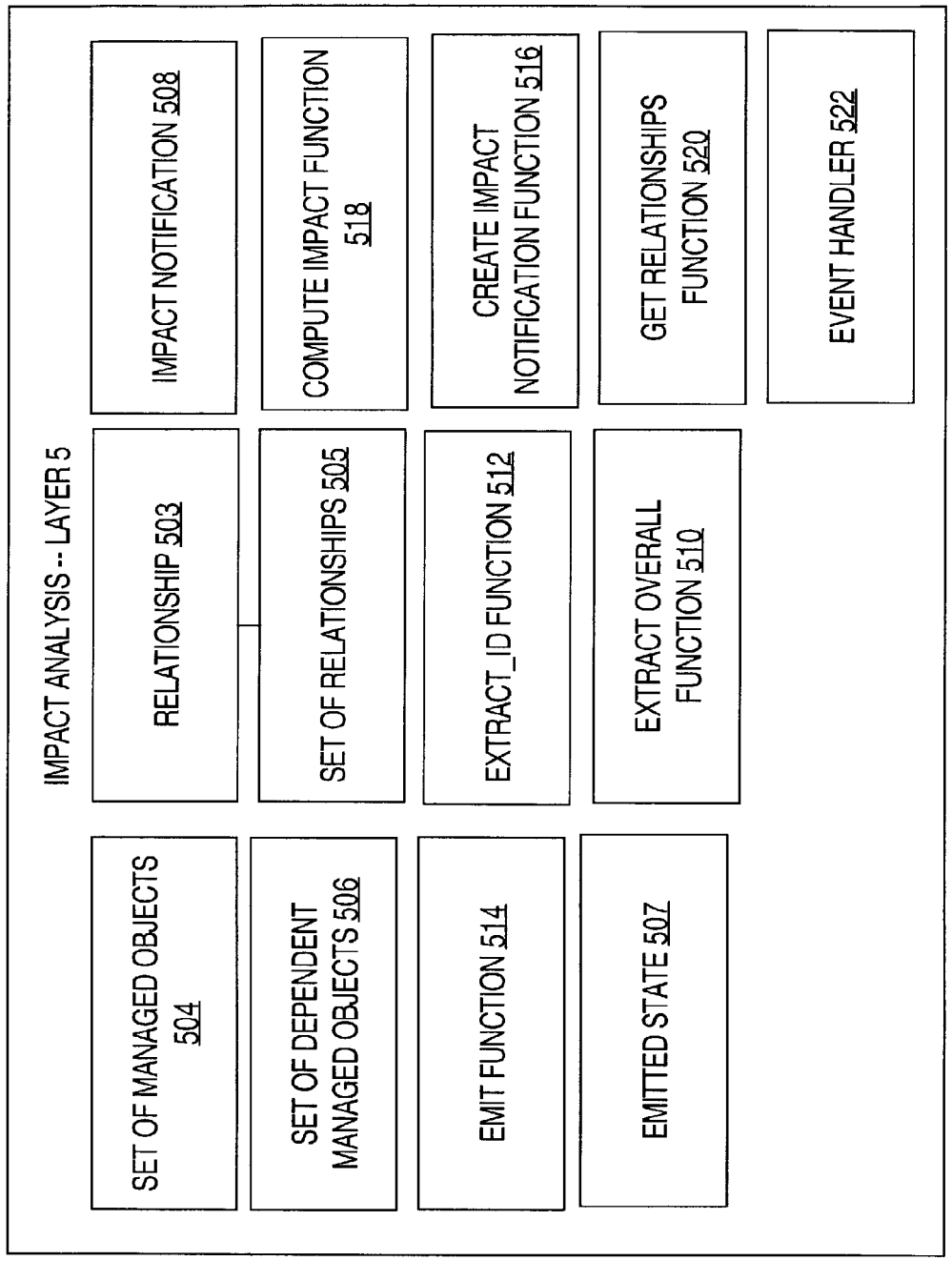
FIG. 5A is a block diagram that illustrates structures associated with the Impact Analysis—Layer 5.

FIG. 5A is a block diagram that illustrates structures associated with the Impact Analysis—Layer 5.

Set of Managed Objects 504 is a set of managed objects that the Notification—Layer 6 is tracking. Set Of Dependent Managed Objects 506 is a set of managed objects that are dependent on the managed objects in the Set Of Managed Objects 504. For example, the Set Of Managed Objects 504 may comprise managed objects for Router 2, Link L3, and Client 3; for Router 3, the Set Of Dependent Managed Objects 506 may comprise managed objects for Links L1 and L2; for Router 2, the Set Of Dependent Managed Objects 506 may comprise a managed object for Link L3; and for Link L3, the Set Of Dependent Managed Objects 506 may comprise a managed object for Client 3.

The Emit Function 514 receives a Set Of Managed Objects 504, and returns an Emitted State 507. Relationship 503 is a grouping of a Set Of Managed Objects 504, a Set Of Dependent Managed Objects 506, and an Emit Function 514. According to one embodiment, the Emit Function 514 is a customized function. Set Of Relationships 505 comprises one or more Relationships 503. For example, there is a relationship between Router 2 and Link L3, where Link L3 is dependent on Router 2. Furthermore, there is a relationship between Link L3 and Client 3, where Client 3 is dependent on Link L3. According to one embodiment, a particular relationship, such as Relationship 503, may have a customized Emit Function 514. For example, there may be two different emit functions, one for the relationship between Router 2 and Link L3, and another for the relationship between Link L3 and Client 3.

The Extract_ID Function 512 extracts a managed object identifier from a condition notification. For example, Extract_ID Function 512 extracts the Managed Object Identifier 160 from the Condition Notification 540.

The Extract Overall Function 510, according to one embodiment, is an overloaded method that can be invoked in two different ways. If the Extract Overall Function 510 is passed a managed object identifier, such as Managed Object Identifier 160, it returns the old overall condition associated with the managed object, such as Managed Object 158. If the Extract Overall Function 510 is passed a condition notification, such as Condition Notification 548, it returns the new overall condition, e.g., Overall Condition 420, associated with the Condition Notification 540.

An Impact Notification 508 comprises information that is used to notify subscribers of the impact of an event, such as a router down event, which occurred at a device, such as Router 2. Compute Impact Function 518 receives a managed object, such as Managed Object 158, the new overall condition, such as Overall Condition 420, and a condition notification, such as Condition Notification 418, and computes the impact of the event that occurred at a device on the managed objects for devices that depend on that device. For example, if Router 2 goes down, then Compute Impact Function 518 computes the impact of Router 2 going down on Link L3 and Client 3. If Router 3 goes down, then the Compute Impact Function 518 computes the impact of Router 3 going down on Link L1 and Link L2. According to one embodiment, the Compute Impact Function 518 is a recursive function so that if Router 3 goes down, the impact on all the entities that depend on Router 3 is computed. For example, in the first recursive invocation of the Compute Impact Function 518, the impact on Link L1 and Link L2 is computed. In subsequent invocations, the impact on Router 1 and Router 2 is computed, and so on.

Create Impact Notification Function 516 receives a managed object, such as Managed Object 158, the new overall condition, such as Overall Condition 420, and a condition notification, such as Condition Notification 418, and creates an Impact Notification 508. Get Relationships Function 520 returns a Set Of Relationships 505 associated with a particular Managed Object Identifier, such as Managed Object Identifier 160. According to one embodiment, Event Handler 522 performs the logic depicted in FIG. 5C, FIG. 5D, and FIG. 5E.

Figure 5C:
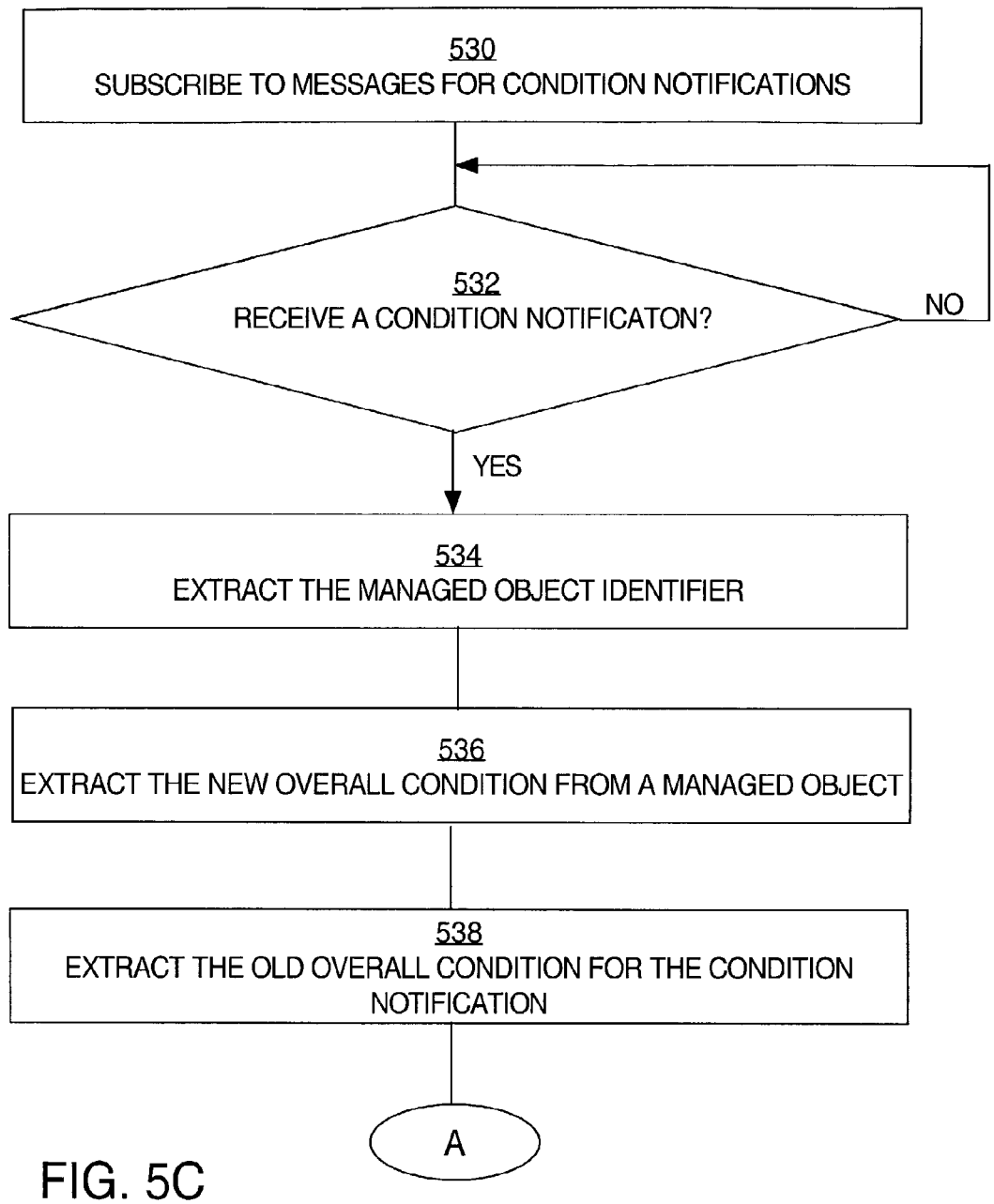
FIG. 5C, FIG. 5D, and FIG. 5E are flow diagrams that illustrate a high level overview of one embodiment of a method performed by the Impact Analysis—Layer 5.
Figure 5D:
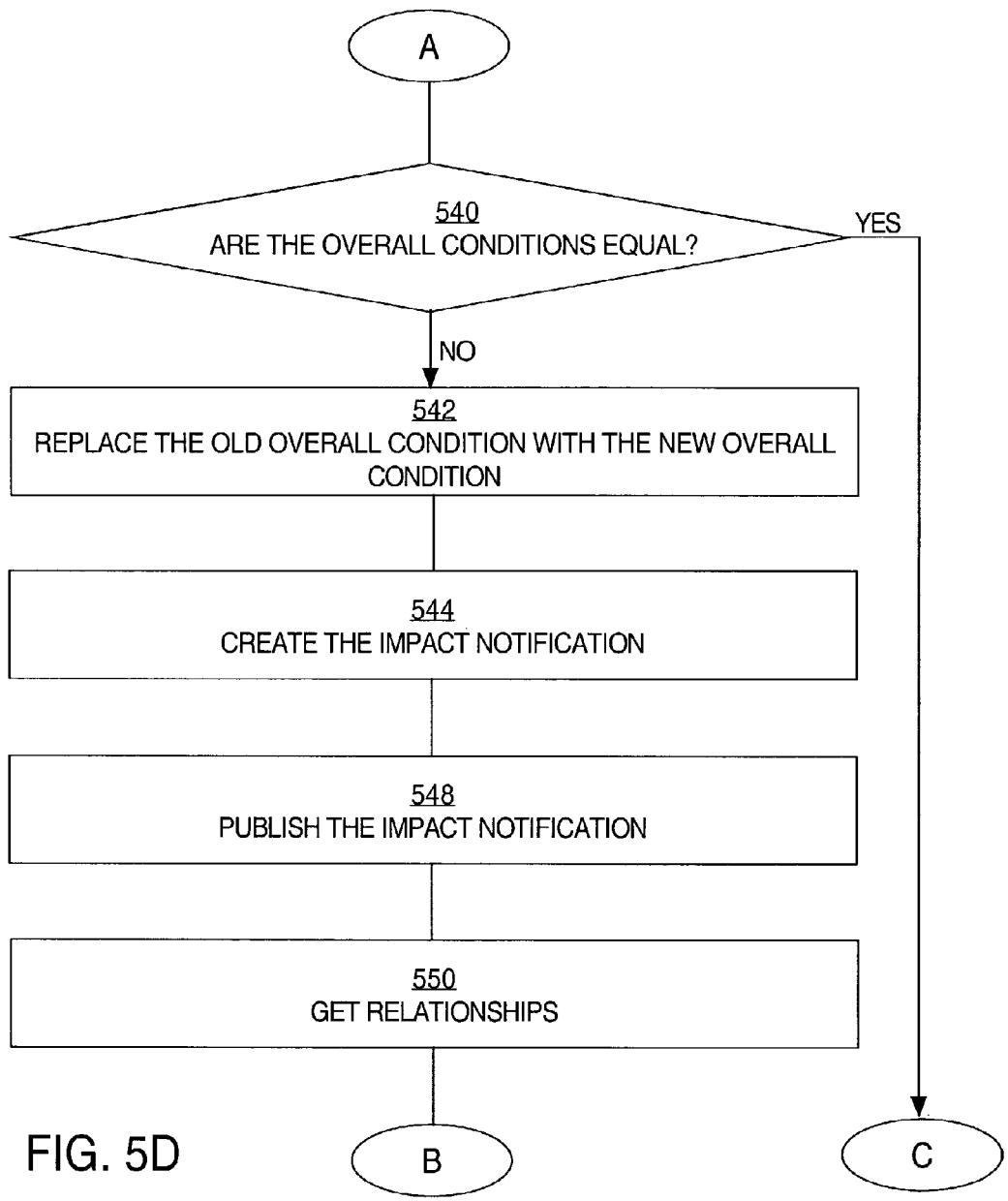
Figure 5E:
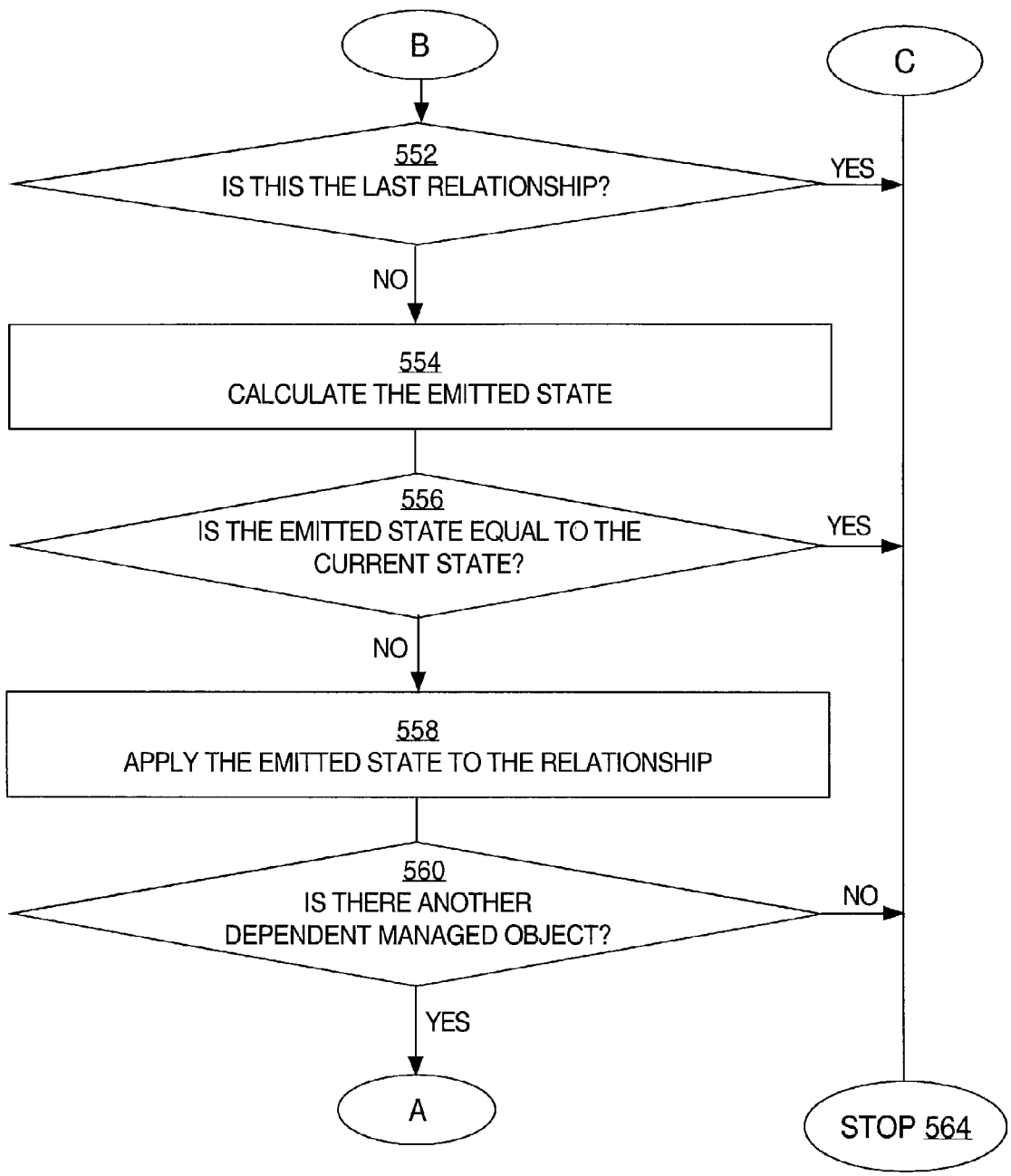

FIG. 5C, FIG. 5D, and FIG. 5E are flow diagrams that illustrate a high level overview of one embodiment of a method performed by the Impact Analysis—Layer 5. Referring first to FIG. 5C, at step 530, the Event Handler subscribes to messages for Condition Notifications. For example, the Event Handler 522 subscribes to Condition Notification 418.

At decision box 532, the Event Handler waits until it receives a condition notification that is published by Layer 4 and transported using Layer 1. For example, the Event Handler 522 waits until it receives Condition Notification 418.

Once a condition notification arrives, the Event Handler proceeds to step 534 where it extracts the managed object identifier from the condition notification. For example, the Event Handler 522 proceeds to step 534, where the Event Handler 522 invokes the Extract_ID Function 512 by passing the Condition Notification 418 as a parameter, and the Extract_ID Function 512 returns the Managed Object Identifier 160.

At step 536, the Event Handler extracts the old overall condition from a particular managed object. For example, the Event Handler 522 invokes the Extract Overall Function 510 by passing in the Managed Object Identifier 160 and the Extract Overall Function 510 returns the old overall condition, which was previously associated with Managed Object 158.

At step 538, the Event Handler extracts the new overall condition from the condition notification. For example, the Event Handler 522 invokes the Extract Overall Function 510 by passing in the Condition Notification 418 and the Extract Overall Function 510 returns the new overall condition, e.g., Overall Condition 420.

Processing continues at step 540 of FIG. 5D. The steps 540 through 560 are performed by the Compute Impact Function 518, which, according to one embodiment, is a recursive function. For example, if Router 2 is down, the Managed Object that represents Link L3 is notified so that the Managed Object that represents Link L3 can take this into account. Since, according to one embodiment, steps 540 through 560 form a recursive function, Client 3, which depends on Link L3, is also notified that Router 2 is down in subsequent recursive invocations of the Compute Impact Function 518.

At decision box 540, the Event Handler 522 determines whether the overall conditions are equal. For example, Event Handler 522 determines whether the Overall Condition 420 of "router down" is equal to the old overall condition of "router down". If they are equal, then processing stops at step 564. If the overall conditions are not equal, then processing proceeds to step 542.

At step 542, the old overall condition is replaced with the new overall condition for a particular managed object. For example, the old overall condition, associated with Managed Object 158, is replaced with the new overall condition, e.g., Overall Condition 420, associated with the Condition Notification 418.

At step 544, the Event Handler creates an impact notification. For example, the Event Handler 522 invokes the Create Impact Notification Function 516 by passing the Managed Object 160, the new overall condition, e.g., Overall Condition 420, and the Condition Notification 418 as parameter values.

At step 548, the Event Handler publishes the impact notification. For example, the Event Handler 522 publishes the Impact Notification 508. At step 550, the Event Handler gets the relationships that are impacted by the Impact Notification 508. For example, The Event Handler 522 invokes the Get Relationships Function 520, by passing in the Managed Object Identifier 160, which identifies Router 2, and the Get Relationships Function 520 returns Set of Relationships 505. In this example, Set of Relationships 505 comprises two Relationships 503, a first Relationship 503 that is between Router 2 and Link L3 and a second Relationship 503 that is between Link L3 and Client 3.

Referring next to FIG. 5E, at steps 552 through 560, the emitted state for a particular managed object is applied to all of the managed objects that are related to that particular managed object. For purposes of explanation, assume that the related managed objects are dependent on the particular managed object. At decision box 552, a decision is made as to whether the then-current relationship is the last relationship. In this example, the Compute Impact Function 518 processes the two Relationships 503 already described herein.

At step 554, the Compute Impact Function determines the emitted state for a particular relationship. For example, the Compute Impact Function 518 invokes the Emit Function 514 by passing the Set Of Managed Objects 504 as a parameter. The Emit Function 518 returns an Emitted State 507, which reflects not only the overall condition of a particular entity but also the relationship of that entity to other entities. According to one embodiment, each time step 554 is processed the value associated with the Emitted State 507 is saved in a current state variable prior to invoking the Emit Function 518. According to another embodiment, the first time step 554 is processed the value returned by the Emit Function 518 is saved in the Emitted State 507 and in an initial state variable. For example, if a particular device is reachable from two routers, and one of the routers goes down, then the device is still reachable. However, if the particular device is only reachable from one router and that one router goes down, then the particular device is no longer reachable. In another example, a power supply may have three redundant power sources. The power supply is considered operative until all three power sources are down.

According to one embodiment, the Emit Function 514 may use various algorithms to compute an overall condition. These algorithms comprise, among other things, determining the minimum value, the maximum value, the sum of all the values, the mean of all the values, or the relative importance of an entity within the Set Of Managed Objects 504. For example, the Emit Function 514 could return a minimum value for States 410 associated with the managed objects in the Set Of Managed Objects 504, or a maximum value for States 410 associated with the managed objects in the Set Of Managed Objects 504. Furthermore, the Emit Function 514 may return the relative importance of a grouping of entities. According to one embodiment, some of the entities, such as phones, may be children of another entity, such as a switch. For example, switches may be assigned a weight of "5" and phones may be assigned a weight of "1". A switch with three phones would have a relative importance of "8" whereas a switch with four phones would have a relative importance of "9". Assume that a particular switch is associated with three regular phones that have weights of "1", but one extremely important phone that has a weight of "10". This particular switch would then have a relative importance of "18", e.g., 5+3+10.

At decision box 556, a determination is made as to whether the emitted state is equal to the current state. For example, if the Emitted State 507 that was determined for the first Relationship 503 is equal to the current state, then processing proceeds to step 558. Alternatively, if the Emitted State 507 that was determined for the first Relationship 503 is equal to the initial state, then processing proceeds to step 558. Otherwise, processing stops at step 564.

At step 558, the Compute Impact Function applies the emitted state to the relationship. For example, if Router 3 is down, then the Emitted State 507 for Router 3 is applied to Link L1, Router 2, Link L3, and Client 3.

At decision box 560, a determination is made as to whether there are any more dependent managed objects. For example, since this is the first recursive invocation of the Compute Impact Function 518, processing proceeds to decision box 540 for the managed objects that are dependent on Router 2, which in this example is Link L3. In the second recursive invocation, the second Relationship 503 is processed where Client 3 is the managed object that depends on Link L3.

At step 564, processing is complete and control returns. For example, when the Compute Impact Function 518 has processed all of the managed objects that depend on the managed objects in the Set of Relationships 505, then processing proceeds to step 564 where processing completes and control returns.

4.6 Process of Providing Notification

Figure 6A:
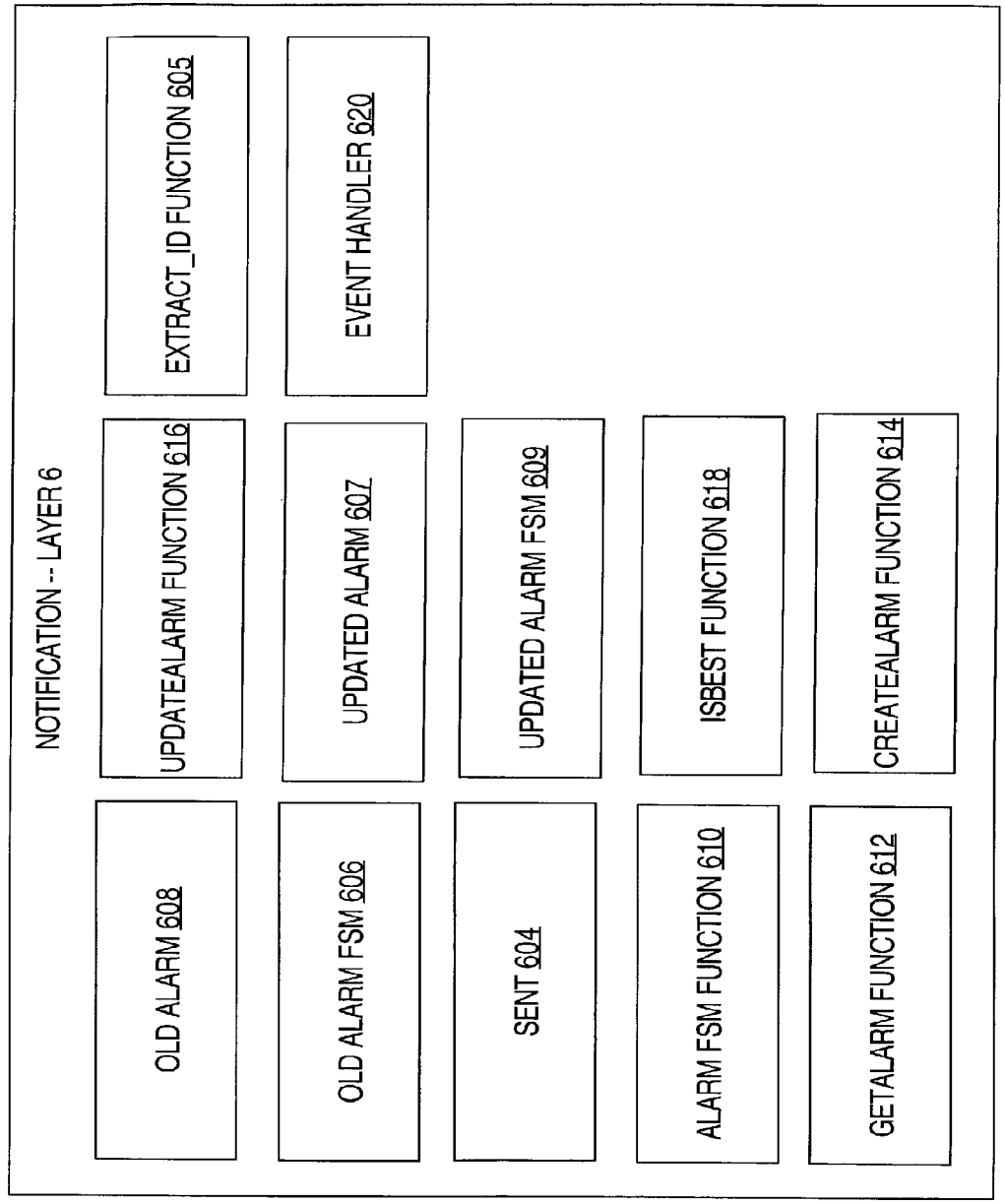
FIG. 6A is a block diagram that illustrates structures associated with the Notification—Layer 6.

FIG. 6A is a block diagram that illustrates structures associated with the Notification—Layer 6.

An Old Alarm 608 is created when an event, such as a router is down, occurs at a managed object, such as the Managed Object 158. For each Old Alarm 608, there is an Old Alarm FSM 606 for tracking the state of the Old Alarm 608. For example, is the state of the Old Alarm 608, "Open" or "Closed"? According to one embodiment, "Open" means a network administrator or system is working on the problem associated with the Old Alarm 608 and "Closed" means the problem is resolved.

Sent 604 is a set of managed object identifiers, such as Managed Object Identifier 160, and alarms, such as Old Alarm 608 or Updated Alarm 607. In so doing, the Notification—Layer 6 tracks all of the managed object identifiers for the impact notifications, such as Impact Notification 508, that have been sent out. For example, if Router 2 is down and Router 1 has degraded throughput, Sent 604 may have two Old Alarms 608—a first Old Alarm 608 for Router 1 and a second Old Alarm 608 for Router 2.

Getalarm function 612 returns an Old Alarm 608 for a particular managed object identifier. For example, if an Old Alarm 608 was created and transmitted to the Network 101 by the Heuristics—Layer 7, then Getalarm Function 612 will return this Old Alarm 608 when the Managed Object Identifier 158 is passed into Getalarm Function 612. If an Old Alarm 608 for a particular managed object identifier, such as Managed Object Identifier 160, already exists, and a subsequent Condition Notification 418 is received for the same managed object that was responsible for generating the Old Alarm 608, then the Updatealarm Function 616, may be used to create an Updated Alarm 607. According to one embodiment, the Updatealarm Function 616 receives the Old Alarm 608, and the Impact Notification 508 as parameters and returns an Updated Alarm 607. An Updated Alarm FSM 609 is associated with the Updated Alarm 607.

The IsBest Function 618 receives an Indication Notification 508 and returns a true if the Old Alarm FSM 606 is in a state of "Closed", and a false if the Old Alarm FSM 606 is in a state of "Open". Createalarm Function 614 receives an Impact Notification 508 and creates an Old Alarm 608. Extract_ID Function 605 by passing the Impact Notification 508 as a parameter and the Extract_ID Function 605 returns the managed object identifier, such as Managed Object Identifier 160. According to one embodiment, the Old Alarm 608, the Old Alarm FSM 606, the Updated Alarm 607, and the Updated Alarm FSM 609 are maintained in the Inventory 150. According to one embodiment, Event Handler 620 performs the logic depicted in FIG. 6C, FIG. 6D, FIG. 6E, and FIG. 6F.

FIG. 6C, FIG. 6D, FIG. 6E, and FIG. 6F are flow diagrams that illustrate a high level overview of one embodiment of a method performed by the Notification—Layer 6.

Figure 6C:
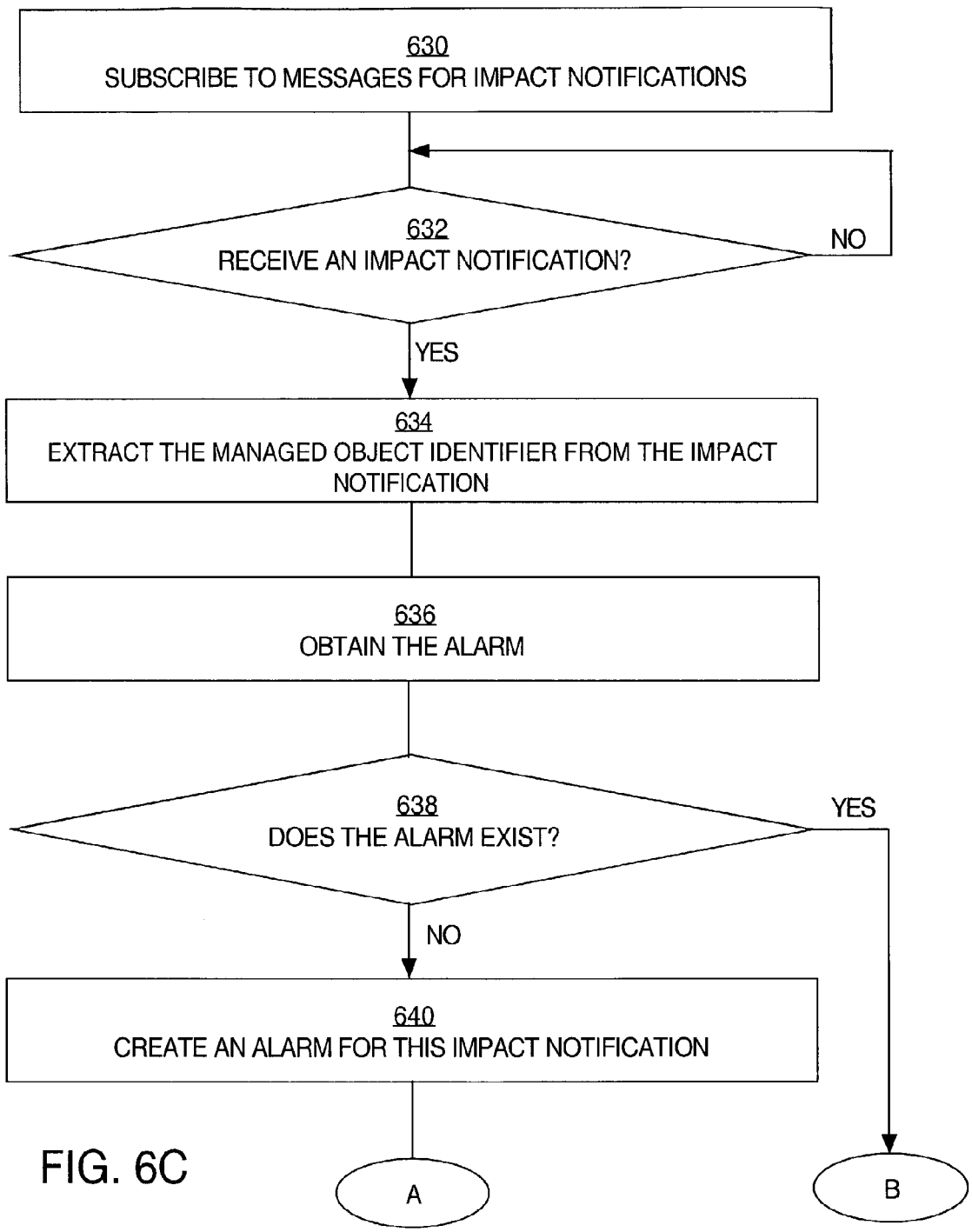

Referring first to FIG. 6C, at step 630, the Event Handler subscribes to messages for impact notifications. For example, the Event Handler 620 subscribes to Impact Notification 508 messages that are generated by Layer 5. At the decision box 632, the Event Handler waits until it receives an Impact Notification. For example, the Event Handler 620 waits until it receives the Impact Notification 508.

Once an Impact Notification arrives, the Event Handler proceeds to step 634 where it extracts the managed object identifier from the impact notification. For example, the Event Handler 620 invokes the Extract_ID Function 605 by passing the Impact Notification 508 as a parameter and the Extract_ID Function 605 returns the Managed Object Identifier 160.

At step 636, the Event Handler obtains the Alarm. For example, the Event Handler 620 invokes the Getalarm Function 612 by passing the Managed Object Identifier 160 as a parameter and the Getalarm Function 612 returns the Old Alarm 608 that is associated with the Managed Object Identifier 160.

At decision box 638, the Event Handler determines whether the Alarm exists. For example assume that, at step 636, the Getalarm Function 612 returns the Old Alarm 608. According to one embodiment, the Event Handler 620 continues processing at step 648; otherwise, Getalarm Function 612 returns a null value, or other specified value and the Event Handler 620 continues processing at step 640.

At step 640, the Event Handler creates an Alarm for this Impact Notification. For example, since it was determined at decision box 638 that the Old Alarm 608 does not exist, then Event Handler 620 invokes the Createalarm Function 612 by passing the Impact Notification 508 as a parameter. The Createalarm Function 612 creates and returns the Old Alarm 608.

Figure 6D:
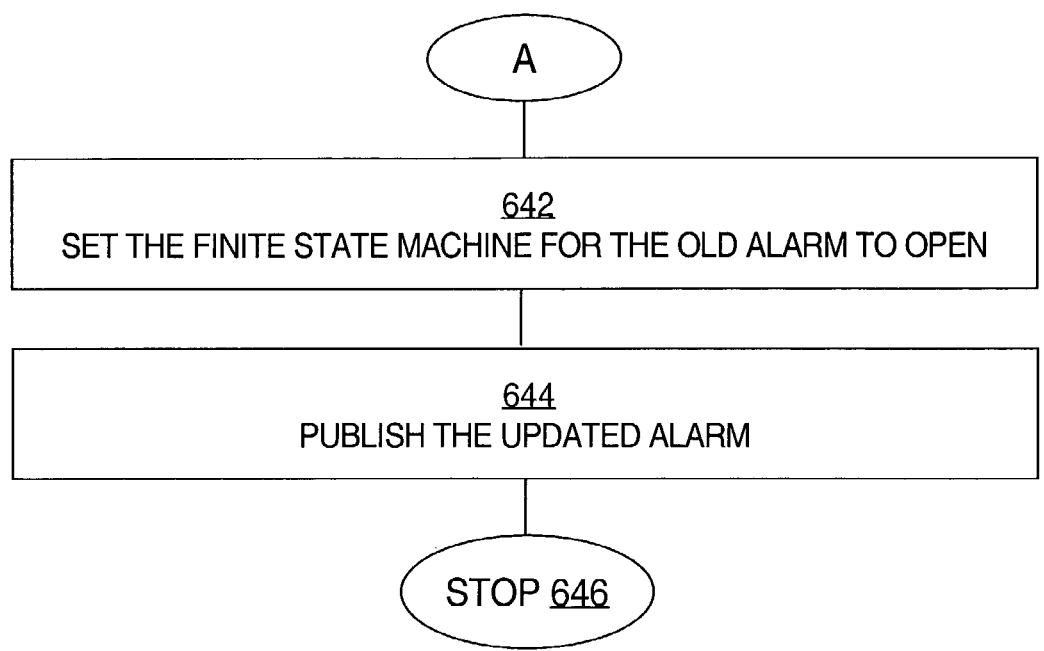
Figure 6F:
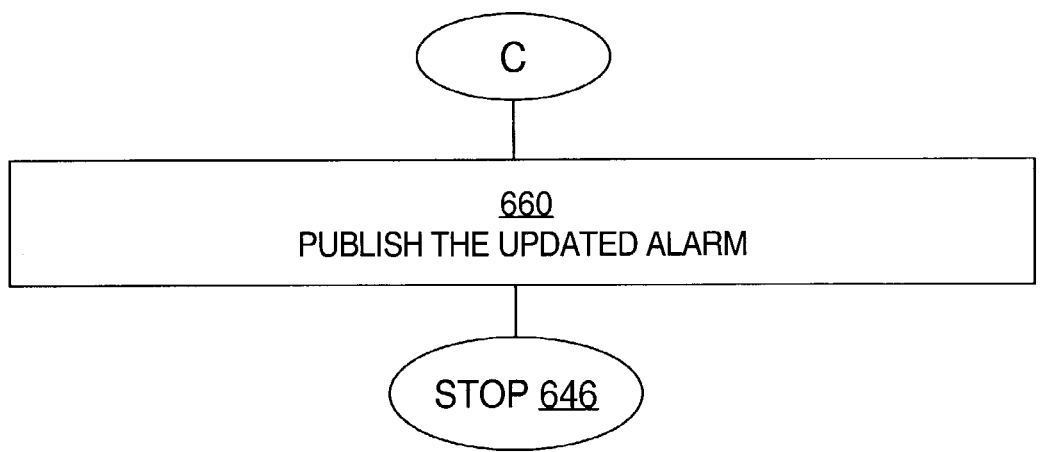

Referring now to FIG. 6D, at step 642, the Event Handler sets the Finite State Machine for a particular Alarm to "Open". For example, the Event Handler 620 sets the Old Alarm FSM 606, which is associated with Old Alarm 608, to "Open".

At step 644, the Event Handler publishes the Alarm. For example, Event Handler 620 publishes the Old Alarm 608. Then processing proceeds to step 646.

At step 648, the Event Handler updates the old alarm with the new alarm. For example, since at decision box 638 the Event Handler 620 determined that the Old Alarm 608 exists, the Event Handler 620 invokes the Updatealarm Function 616 by passing the Old Alarm 608 and the Impact Notification 508 in as parameters. The Updatealarm Function 616 returns the Updated Alarm 607.

At decision box 650, a decision is made as to whether the updated alarm and the old alarm are the same. For example, the Event Handler 620 compares the Old Alarm 608 with the Updated Alarm 607 to determine if they are the same. If the Old Alarm 608 and the Updated Alarm 607 are the same, then processing proceeds to step 654; otherwise, processing proceeds to decision box 656.

At decision box 652, a determination is made as to whether the new alarm is in the best health or condition. For example, the Event Handler 620 invokes the IsBest Function 618 by passing the Impact Notification 508 as a parameter. If the Old Alarm FSM 606 is in a state of "Closed", then the IsBest Function 618 returns a true and processing proceeds to step 654. If the Old Alarm FSM 606 is in a state of "Open", then the IsBest Function 618 returns a false and processing proceeds to decision box 656.

At step 654, the finite state machine of the new alarm is set to "Closed". For example, since the New Alarm FSM 609 is the finite state machine for Updated Alarm 607 and the IsBest Function 618 indicated, at decision box 652, that the condition of the Managed Object 158 is better, the Event Handler 620 sets the New Alarm FSM 609 to "Closed".

At decision box 656, a determination is made as to whether the finite state machine of the new alarm is "Closed". For example, if the New Alarm FSM 609 is set to "Closed", then processing continues to step 658; otherwise, processing proceeds to step 660.

At step 658, the finite state machine of the old alarm is set to "Open". For example, since, at step 652, the IsBest Function 618 indicated that the condition of the managed object is not better, the Event Handler 620 sets the Old Alarm FSM 606 to "Open".

At step 660, the Event Handler publishes the new alarm. For example, the Event Handler 620 publishes the Updated Alarm 607.

At step 646, processing is complete and control returns.

4.7 Process of Providing Heuristics

Figure 7A:
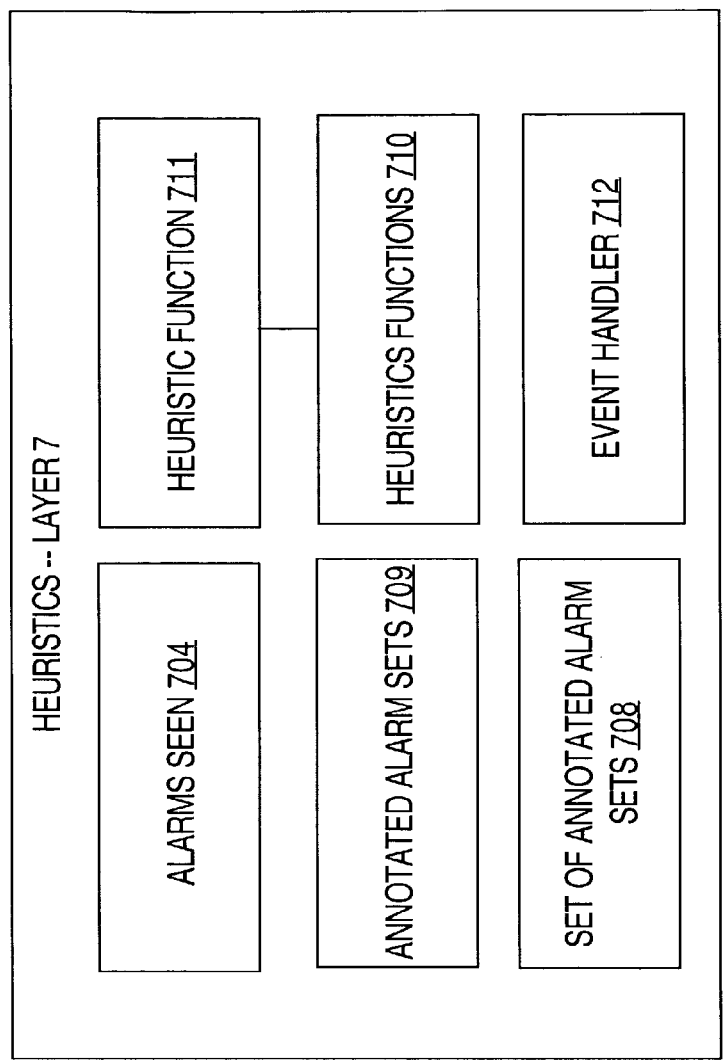
FIG. 7A is a block diagram that illustrates structures associated with the Heuristics—Layer 7.

FIG. 7A is a block diagram that illustrates structures associated with the Heuristics—Layer 7.

Alarms Seen 704 is a set of alarms that have been received by the Heuristics—Layer 7. For example, when the Notification—Layer 6 publishes an alarm, such as Old Alarm 608 or Updated Alarm 607, the Heuristics—Layer 7 receives this alarm, which is the "new alarm" to Layer 7, and adds it to Alarms Seen 704. An Annotated Alarm Set 709 comprises one or more annotated alarms that are grouped together on the basis of a decision by some heuristic function. The overall result of the heuristic are indicated in each alarm in the set. For example, a particular annotated alarm of the Annotated Alarm Set 709 may comprise an indication that the failures of routers 1 and 2 are related to the failure of Router 3.

According to one embodiment, there is more than one Annotated Alarm Set 709. A Set of Annotated Alarm Sets 708 is a set of one or more of the Annotated Alarm Sets 709. For each Annotated Alarm Set 709, there is a Heuristic Function 711 that receives a new alarm and Alarms Seen 704. The Heuristic Function 711 returns a particular Annotated Alarm Set 709. According to one embodiment, Heuristics Functions 710 comprises one or more Heuristic Functions, such as Heuristic Function 711. According to one embodiment, Event Handler 712 performs the logic depicted in FIG. 7C.

Figure 7C:
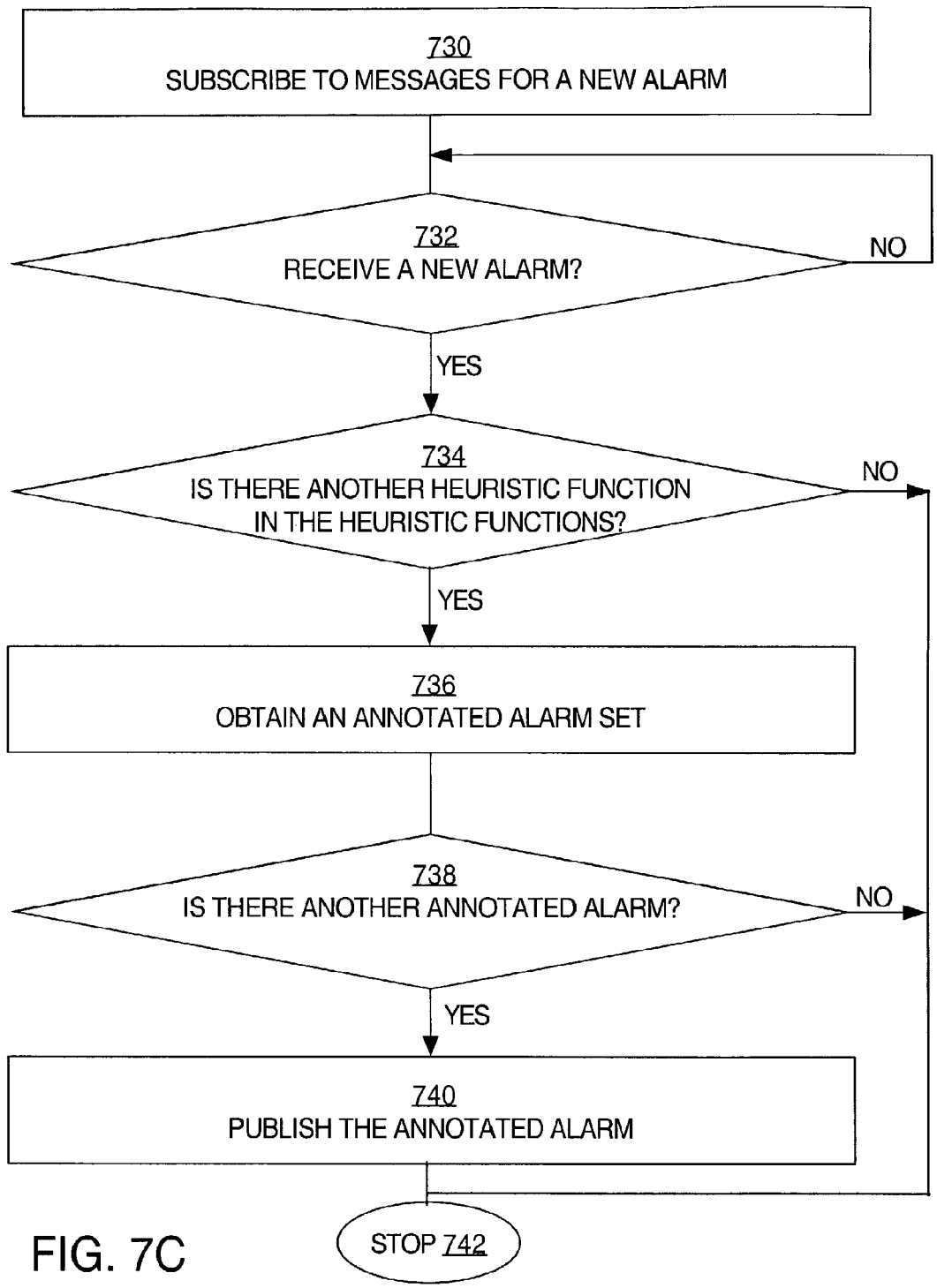
FIG. 7C is a flow diagram that illustrates a high level overview of one embodiment of a method performed by the Heuristics—Layer 7.

FIG. 7C is a flow diagram that illustrates a high level overview of one embodiment of a method performed by the Heuristics—Layer 7. At step 730, the Event Handler subscribes to messages for a new alarm. For example, the Event Handler 712 subscribes to the new alarm.

At the decision box 732, the Event Handler waits until it receives a new alarm. For example, the Event Handler 712 waits until it receives the new alarm. Once the new alarm arrives, the Event Handler 712 proceeds to the decision box 734.

At the decision box 734, the Event Handler determines whether there is another Heuristic Function that should be called. For example, if there is another Heuristic Function 711 in the Heuristics Functions 710, then the Event Handler 712 processing continues to step 736; otherwise, the Event Handler 712 stops processing at step 742.

At step 736, the Event Handler obtains an annotated alarm set. For example, the Event Handler 712 obtains a particular Annotated Alarm Set 709, by invoking a particular Heuristic Function 711, from the Heuristics Functions 710. The Heuristic Function 711 receives parameters for the Alarms Seen 704 and the new alarm. The Heuristic Function 711 returns a particular annotated alarm set, such as Annotated Alarm Set 709.

At decision box 738, the Event Handler determines whether there is another annotated alarm in the particular annotated alarm set. For example, the Event Handler 712 determines whether there is another annotated alarm in the Annotated Alarm Set 709. If there is, processing continues to step 740 where the annotated alarm is published; otherwise processing stops at step 742. If there is another annotated alarm in the Annotated Alarm Set 709 then the Event Handler 712 processing continues to step 740; otherwise, the Event Handler 712 proceeds to step 742 where processing is complete and control returns.

The architecture as described herein provides for a plurality of layers. Each layer addresses a separate problem where each layer adds information while reducing the amount of communication between the managed entities and the management station. The layers allow for a scalable solution that can be distributed across a network. For example, in the context of banking, Layers 2-4 may executed on 100 branch offices while Layers 5-7 are centralized. In so doing, condition detection is performed in close proximity to where errors occur, while impact analysis is centralized. Furthermore, the layers allow for third party network management systems to inter-operate with techniques described herein. For example, a third party network management system may provide the functionality of some of the layers described herein. By publishing messages that correspond to messages described herein, the third party network management system can inter-operate with the layer that subscribes to that message. Furthermore, by using the "set" new state feature, the third party network management system can set the new state of the finite state machine. The layers also result in code that is easier to maintain.

5.0 IMPLEMENTATION MECHANISMS—HARDWARE OVERVIEW

Figure 8:
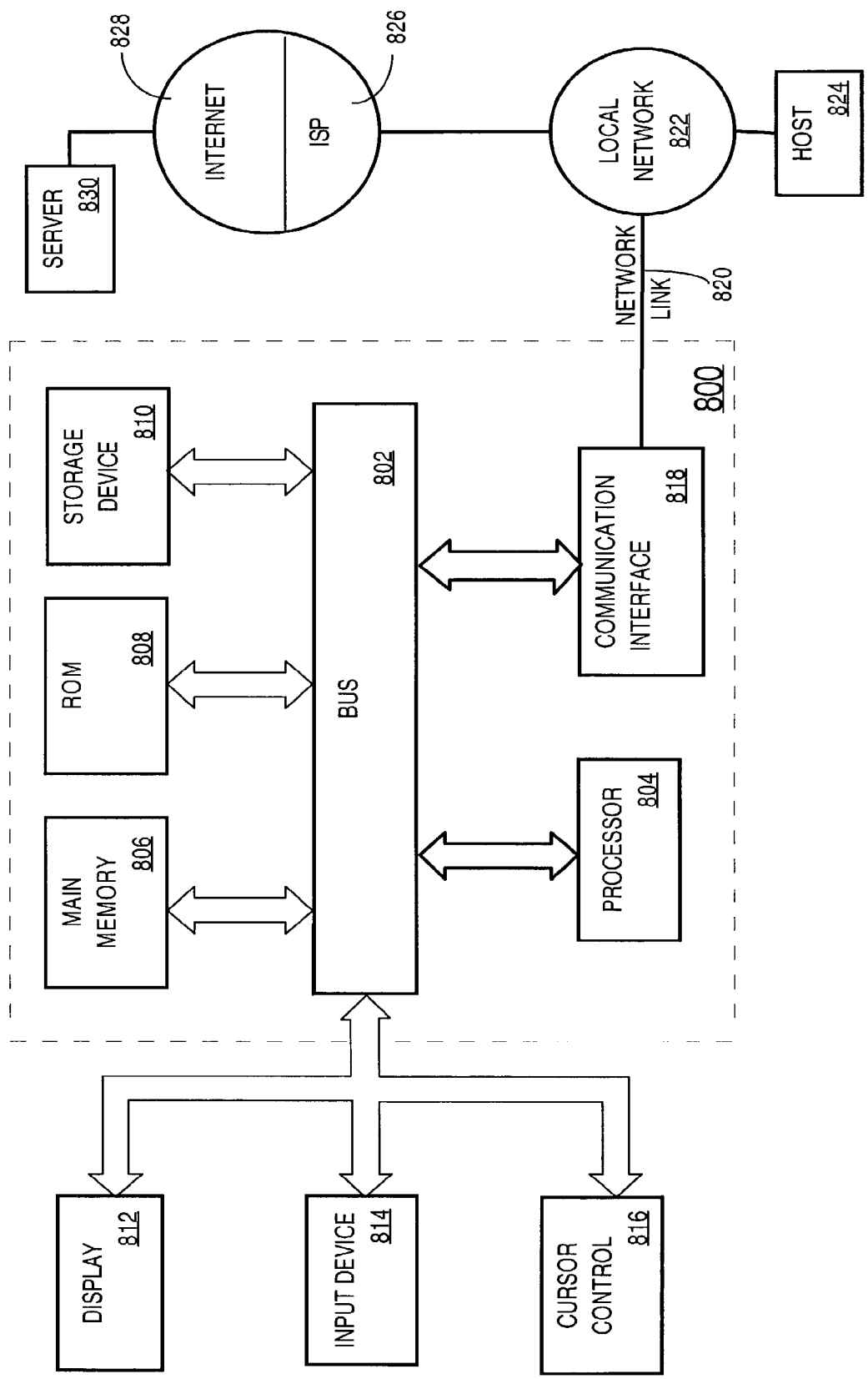
FIG. 8 is a block diagram that illustrates a computer system upon which an embodiment may be implemented.

FIG. 8 is a block diagram that illustrates a computer system 800 upon which an embodiment of the invention may be implemented. Computer system 800 includes a bus 802 or other communication mechanism for communicating information, and a processor 804 coupled with bus 802 for processing information. Computer system 800 also includes a main memory 806, such as a random access memory ("RAM") or other dynamic storage device, coupled to bus 802 for storing information and instructions to be executed by processor 804. Main memory 806 also may be used for storing temporary variables or other intermediate information during execution of instructions to be executed by processor 804. Computer system 800 further includes a read only memory ("ROM") 808 or other static storage device coupled to bus 802 for storing static information and instructions for processor 804. A storage device 810, such as a magnetic disk or optical disk, is provided and coupled to bus 802 for storing information and instructions.

Computer system 800 may be coupled via bus 802 to a display 812, such as a cathode ray tube ("CRT"), for displaying information to a computer user. An input device 814, including alphanumeric and other keys, is coupled to bus 802 for communicating information and command selections to processor 804. Another type of user input device is cursor control 816, such as a mouse, trackball, stylus, or cursor direction keys for communicating direction information and command selections to processor 804 and for controlling cursor movement on display 812. This input device typically has two degrees of freedom in two axes, a first axis (e.g., x) and a second axis (e.g., y), that allows the device to specify positions in a plane.

The invention is related to the use of computer system 800 for providing notification of network alarms using a plurality of distributed layers. According to one embodiment of the invention, providing notification of network alarms using a plurality of distributed layers is provided by computer system 800 in response to processor 804 executing one or more sequences of one or more instructions contained in main memory 806. Such instructions may be read into main memory 806 from another computer-readable medium, such as storage device 810. Execution of the sequences of instructions contained in main memory 806 causes processor 804 to perform the process steps described herein. In alternative embodiments, hard-wired circuitry may be used in place of or in combination with software instructions to implement the invention. Thus, embodiments of the invention are not limited to any specific combination of hardware circuitry and software.

The term "computer-readable medium" as used herein refers to any medium that participates in providing instructions to processor 804 for execution. Such a medium may take many forms, including but not limited to, non-volatile media, volatile media, and transmission media. Non-volatile media includes, for example, optical or magnetic disks, such as storage device 810. Volatile media includes dynamic memory, such as main memory 806. Transmission media includes coaxial cables, copper wire and fiber optics, including the wires that comprise bus 802. Transmission media can also take the form of acoustic or light waves, such as those generated during radio-wave and infra-red data communications.

Common forms of computer-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, and EPROM, a FLASH-EPROM, any other memory chip or cartridge, a carrier wave as described hereinafter, or any other medium from which a computer can read.

Various forms of computer readable media may be involved in carrying one or more sequences of one or more instructions to processor 804 for execution. For example, the instructions may initially be carried on a magnetic disk of a remote computer. The remote computer can load the instructions into its dynamic memory and send the instructions over a telephone line using a modem. A modem local to computer system 800 can receive the data on the telephone line and use an infra-red transmitter to convert the data to an infra-red signal. An infra-red detector can receive the data carried in the infra-red signal and appropriate circuitry can place the data on bus 802. Bus 802 carries the data to main memory 806, from which processor 804 retrieves and executes the instructions. The instructions received by main memory 806 may optionally be stored on storage device 810 either before or after execution by processor 804.

Computer system 800 also includes a communication interface 818 coupled to bus 802. Communication interface 818 provides a two-way data communication coupling to a network link 820 that is connected to a local network 822. For example, communication interface 818 may be an integrated services digital network ("ISDN") card or a modem to provide a data communication connection to a corresponding type of telephone line. As another example, communication interface 818 may be a local area network ("LAN") card to provide a data communication connection to a compatible LAN. Wireless links may also be implemented. In any such implementation, communication interface 818 sends and receives electrical, electromagnetic or optical signals that carry digital data streams representing various types of information.

Network link 820 typically provides data communication through one or more networks to other data devices. For example, network link 820 may provide a connection through local network 822 to a host computer 824 or to data equipment operated by an Internet Service Provider ("ISP") 826. ISP 826 in turn provides data communication services through the world wide packet data communication network now commonly referred to as the "Internet" 828. Local network 822 and Internet 828 both use electrical, electromagnetic or optical signals that carry digital data streams. The signals through the various networks and the signals on network link 820 and through communication interface 818, which carry the digital data to and from computer system 800, are exemplary forms of carrier waves transporting the information.

Computer system 800 can send messages and receive data, including program code, through the network(s), network link 820 and communication interface 818. In the Internet example, a server 830 might transmit a requested code for an application program through Internet 828, ISP 826, local network 822 and communication interface 818. In accordance with the invention, one such downloaded application provides for providing notification of network alarms using a plurality of distributed layers as described herein.

The received code may be executed by processor 804 as it is received, and/or stored in storage device 810, or other non-volatile storage for later execution. In this manner, computer system 800 may obtain application code in the form of a carrier wave.

6.0 EXTENSIONS AND ALTERNATIVES

In the foregoing specification, the invention has been described with reference to specific embodiments thereof. It will, however, be evident that various modifications and changes may be made thereto without departing from the broader spirit and scope of the invention. The specification and drawings are, accordingly, to be regarded in an illustrative rather than a restrictive sense.

Although the system described herein is in the context of network management, the techniques described herein may be used for any kind of alarm notification. For example, these techniques may be used for monitoring the medical condition of one or more patients.

What is claimed is:

1. A method comprising:
one or more computing devices receiving a message that indicates a first event occurred at a primary entity in a network;
the one or more computing devices determining that one or more entities related to the primary entity are impacted by the first event;
in a notification layer that is hosted in a first process, the one or more computing devices automatically creating and publishing one or more first alarms that indicate the one or more entities are impacted by the first event and one or more second alarms that indicate one or more other entities are impacted by a second event that subsequently occurred at the primary entity;
in a heuristics layer that is hosted in a second process different than the first process and that is subscribed to the notification layer, the one or more computing devices receiving, from the notification layer, the one or more first alarms and the one or more second alarms that were created at the notification layer, and automatically creating, based on stored rules for determining that alarms resulting from events are related, one or more annotated alarms comprising a relationship between the one or more first alarms and the one or more second alarms; and
publishing, by the heuristics layer, the one or more annotated alarms in addition to the one or more first alarms and the one or more second alarms that were previously published.

2. A method as recited in claim 1, wherein a particular first alarm of the one or more first alarms is related to a previous first alarm, and further comprising creating an updated alarm based on the previous first alarm.

3. A method as recited in claim 1, wherein a particular entity of the one or more related entities comprise a dependent entity related to the primary entity; further comprising determining that the one or more entities are impacted by the first event by analyzing an impact that a change in a condition of the primary entity has on the dependent entity.

4. A method as recited in claim 1,
wherein the primary entity is a first router in a packet-switched network;
wherein the one or more related entities include network links, other routers or switches that are related to the first router.

5. A method as recited in claim 1, further comprising:
in an event binding layer that is hosted in a third process different than the first process and the second process, binding the first event to a managed object of an inventory, wherein the managed object represents the primary entity, to create a bound event;
in a condition determination layer that is hosted in a fourth process different than the first process, the second process, and the third process, determining a condition of the primary entity based on the bound event to create one or more condition notifications;
in an impact analysis layer that is hosted in a fifth process different than the first process, the second process, the third process, and the fourth process, analyzing the impact of a particular condition notification on the one or more entities that are related to the primary entity to create one or more impact notifications.

6. A method as recited in claim 5, wherein each of the one or more impact notifications comprises information that notifies an event impact subscriber of an impact of the first event on the one or more entities; further comprising applying the one or more impact notifications to change state of one or more other managed objects in the inventory that represent the one or more entities.

7. A method as recited in claim 1, further comprising determining a condition of the primary entity based at least in part on a current state of one or more finite state machines, wherein the one or more finite state machines comprise one or more states that represent observable criteria associated with the primary entity.

8. One or more non-transitory computer-readable media comprising one or more stored sequences of instructions which when executed by one or more processors, cause the one or more processors to perform:
receiving a message that indicates a first event occurred at a primary entity in a network;
determining that one or more entities related to the primary entity are impacted by the first event;
in a notification layer that is hosted in a first process, automatically creating and publishing one or more first alarms that indicate the one or more entities are impacted by the first event and one or more second alarms that indicate one or more other entities are impacted by a second event that subsequently occurred at the primary entity;

in a heuristics layer that is hosted in a second process different than the first process and that is subscribed to the notification layer, receiving, from the notification layer, the one or more first alarms and the one or more second alarms that were created at the notification layer and automatically creating, based on stored rules for determining that alarms resulting from events are related, one or more annotated alarms comprising a relationship between the one or more first alarms and the one or more second alarms; and publishing, by the heuristics layer, the one or more annotated alarms in addition to the one or more first alarms and the one or more second alarms that were previously published.

9. The computer-readable media as recited in claim 8, wherein a particular first alarm of the one or more first alarms is related to a previous first alarm, and wherein the one or more stored sequences of instructions that, when executed by the one or more processors, cause the one or more processors to perform creating the one or more first alarms include instructions that cause the one or more processors to perform creating an updated alarm based on the previous first alarm.

10. The computer-readable media as recited in claim 8, wherein a particular entity of the one or more related entities comprise a dependent entity related to the primary entity, and wherein the one or more stored sequences of instructions that, when executed by the one or more processors, cause the one or more processors to perform determining that the one or more entities are impacted by the first event include instructions that cause the one or more processors to perform analyzing an impact that a change in a condition of the primary entity has on the dependent entity.

11. The computer-readable media as recited in claim 8,
wherein the primary entity is a first router in a packet-switched network;
wherein the one or more related entities include network links, other routers or switches that are related to the first router.

12. The computer-readable media as recited in claim 8, wherein the one or more stored sequences of instructions that, when executed by the one or more processors, cause the one or more processors to perform determining that the one or more entities are impacted by the first event include instructions that cause the one or more processors to perform:

in an event binding layer that is hosted in a third process different than the first process and the second process, binding the first event to a managed object of an inventory, wherein the managed object represents the primary entity, to create a bound event;

in a condition determination layer that is hosted in a fourth process different than the first process, the second process, and the third process, determining a condition of the primary entity based on the bound event to create one or more condition notifications;

in an impact analysis layer that is hosted in a fifth process different than the first process, the second process, the third process, and the fourth process, analyzing the impact of a particular condition notification on the one or more entities that are related to the primary entity to create one or more impact notifications.

13. The computer-readable media as recited in claim 12, wherein each of the one or more impact notifications comprises information that notifies an event impact subscriber of an impact of the first event on the one or more entities, wherein the one or more stored sequences of instructions, when executed by the one or more processors, further cause the one or more processors to perform applying the one or more impact notifications to change state of one or more other managed objects in the inventory that represent the one or more entities.

14. The computer-readable media as recited in claim 8, wherein the one or more stored sequences of instructions, when executed by the one or more processors, further cause the one or more processors to perform determining a condition of the primary entity based at least in part on a current state of one or more finite state machines, wherein the one or more finite state machines comprise one or more states that represent observable criteria associated with the primary entity.

15. An apparatus comprising:
one or more computing devices configured to receive a message that indicates a first event occurred at a primary entity in a network; and determine that one or more entities related to the primary entity are impacted by the first event;

the one or more computing devices configured with a notification layer hosted in a first process and a heuristics layer hosted in a second process different than the first process, wherein the heuristics layer is subscribed to the notification layer;

the notification layer configured to automatically create and publish one or more first alarms that indicate the one or more entities are impacted by the first event and one or more second alarms that indicate one or more other entities are impacted by a second event that subsequently occurred at the primary entity;

the heuristics layer configured to receive, from the notification layer, the one or more first alarms and the one or more second alarms that were created at the notification layer and automatically create, based on stored rules for determining that alarms resulting from events are related, one or more annotated alarms comprising a relationship between the one or more first alarms and the one or more second alarms; and the heuristics layer configured to publish the one or more annotated alarms in addition to the one or more first alarms and the one or more second alarms that were previously published.

16. An apparatus as recited in claim 15, wherein a particular first alarm of the one or more first alarms is related to a previous first alarm, and wherein the notification layer is configured to create the one or more first alarms at least in part by creating an updated alarm based on the previous first alarm.

17. An apparatus as recited in claim 15, wherein a particular entity of the one or more related entities comprise a dependent entity related to the primary entity, and wherein the one or more computing devices are configured to determine that the one or more entities are impacted by the first event at least in part by analyzing an impact that a change in a condition of the primary entity has on the dependent entity.

18. An apparatus as recited in claim 15,
wherein the primary entity is a first router in a packet-switched network;
wherein the one or more related entities include network links, other routers or switches that are related to the first router.

19. An apparatus as recited in claim 15, wherein the one or more computing devices comprise an event binding layer hosted in a third process different than the first process and the second process, a condition determination layer hosted in a fourth process different than the first process, the second process, and the third process, and an impact analysis layer hosted in a fifth process different than the first process, the second process, the third process, and the fourth process; wherein the event binding layer, the condition determination layer, and the impact analysis layer are collectively configured determine that the one or more entities are impacted by the first event;

the event binding layer configured to bind the first event to a managed object of an inventory, wherein the managed object represents the primary entity, to create a bound event;

the condition determination layer configured to determine a condition of the primary entity based on the bound event to create one or more condition notifications;

the impact analysis layer configured to analyze the impact of a particular condition notification on the one or more entities that are related to the primary entity to create one or more impact notifications.

20. An apparatus as recited in claim 19, wherein each of the one or more impact notifications comprises information that notifies an event impact subscriber of an impact of the first event on the one or more entities, the one or more computing devices further configured to apply the one or more impact notifications to change state of one or more other managed objects in the inventory that represent the one or more entities.

21. An apparatus as recited in claim 15, the one or more computing devices configured to determine a condition of the primary entity based at least in part on a current state of one or more finite state machines, wherein the one or more finite state machines comprise one or more states that represent observable criteria associated with the primary entity.

\* \* \* \* \*